(12) United States Patent
Sankar

(10) Patent No.: US 11,047,953 B1
(45) Date of Patent: Jun. 29, 2021

(54) VIRTUAL APERTURE RADAR SYSTEM

(71) Applicant: Scidea Research, Inc., Tustin, CA (US)

(72) Inventor: Pat Sankar, Tustin, CA (US)

(73) Assignee: Scidea Research, Inc., Tustin, CA (US)

( * ) Notice: Subject to any disclaimer, the term of this patent is extended or adjusted under 35 U.S.C. 154(b) by 0 days.

(21) Appl. No.: 17/195,413

(22) Filed: Mar. 8, 2021

(51) Int. Cl.
| | |
|---|---|
| G01S 13/02 | (2006.01) |
| G01S 17/58 | (2006.01) |
| G01S 15/32 | (2006.01) |
| G01S 15/58 | (2006.01) |
| G01S 15/89 | (2006.01) |
| G01S 17/89 | (2020.01) |
| G01S 15/36 | (2006.01) |
| G01S 7/288 | (2006.01) |

(52) U.S. Cl.
CPC .............. G01S 7/288 (2013.01); G01S 13/02 (2013.01); G01S 15/325 (2013.01); G01S 15/36 (2013.01); G01S 15/586 (2013.01); G01S 15/89 (2013.01); G01S 17/58 (2013.01); G01S 17/89 (2013.01); G01S 7/2883 (2021.05)

(58) Field of Classification Search
CPC .......... G01S 7/288; G01S 15/89; G01S 15/36; G01S 17/89; G01S 15/325; G01S 15/586; G01S 17/58; G01S 13/02; G01S 7/2883; G01S 13/931; G01S 13/42; G01S 13/584; G01S 13/89; G01S 7/356; G01S 13/86; G01S 13/878; G01S 13/867; G01S 7/352; H01Q 1/3233; H01Q 21/061; H01Q 21/08; H01Q 21/28; H01Q 3/26; H04B 7/0413

See application file for complete search history.

(56) References Cited

U.S. PATENT DOCUMENTS

| | | | |
|---|---|---|---|
| 7,429,949 B1 * | 9/2008 | Trigui | H01Q 3/30 342/372 |
| 9,759,810 B1 | 9/2017 | Sankar | |
| 10,048,366 B1 * | 8/2018 | Hong | G01S 13/003 |
| 10,139,483 B2 | 11/2018 | Sankar | |
| 2017/0098891 A1 * | 4/2017 | Nishimoto | H04B 7/0617 |
| 2019/0064339 A1 * | 2/2019 | Kuo | H01Q 25/02 |
| 2019/0386712 A1 * | 12/2019 | Fang | H04B 7/043 |
| 2021/0080542 A1 * | 3/2021 | Kim | H01Q 3/40 |

OTHER PUBLICATIONS

Bassem R. Mahafza, "Radar Systems Analysis and Design Using Matlab," Third Edition, CRC Press, 2013.
Rao, "Introduction to mmWave Sensing: FMCW Radars," Apr. 28, 2017.

* cited by examiner

*Primary Examiner* — Olumide Ajibade Akonai
(74) *Attorney, Agent, or Firm* — Knobbe Martens Olson & Bear LLP

(57) ABSTRACT

A target detection and/or high resolution RF system is provided herein in which the resolution of a legacy target angle detection (direction of arrival) system is improved without any change to the existing hardware of the legacy target detection system. Rather, the target detection and/or high resolution RF system can apply virtual aperture post-processing to reflected signals to achieve improvements in the detection of one or more targets.

20 Claims, 20 Drawing Sheets

VIRTUAL APERTURE RADAR SYSTEM

CROSS-REFERENCE TO RELATED APPLICATIONS

Any and all applications for which a foreign or domestic priority claim is identified in the Application Data Sheet as filed with the present application, are hereby incorporated by reference under 37 CFR 1.57.

BACKGROUND

Pulse compression as well as Frequency Modulated Continuous Wave (FMCW) techniques can be used by imaging systems and devices that transmit and/or receive analog signals, such as radio detection and ranging (RADAR) signals, light detection and ranging (LIDAR) signals, sound navigation and ranging (SONAR) signals, ultrasound signals, magnetic resonance imaging (MRI) signals, and/or the like, to identify targets. Various techniques for pulse compression and FMCW are known in the art.

However, conventional techniques have various limitations and disadvantages. For example, some conventional techniques offer high resolution detection of slow-moving or stationary targets, but suffer from Doppler effects or other similar issues when targets are moving at a high speed. Conversely, other conventional techniques offer high resolution detection of targets moving at a high speed, but do not exhibit the range resolution necessary to provide high resolution detection of stationary or slow-moving targets. Still other conventional techniques are useful for detecting targets behind walls or other structures, but exhibit stronger background clutter than other conventional techniques.

SUMMARY

One aspect of the disclosure provides a target detection system. The system comprises a signal generator configured to generate a waveform. The system further comprises a transmitter configured to transmit the waveform via an antenna. The system further comprises a receiver configured to receive a reflected waveform, wherein the reflected waveform comprises a version of the waveform that reflected off a target. The system further comprises a processor in communication with the receiver and configured with specific computer-executable instructions to: determine a real sensor spectrum using the reflected waveform; estimate a preliminary angle of the target based on the real sensor spectrum; predict intermediate virtual sensor data for the target based on the estimated preliminary angle; determine a virtual sensor spectrum using the predicted intermediate virtual sensor data; and combine the real sensor spectrum and the virtual sensor spectrum to form a beamformer output. The system further comprises a display device configured to display a graphical representation of the beamformer output in a user interface.

The system of the preceding paragraph can include any sub-combination of the following features: where the processor is further configured with specific computer-executable instructions to compute a fast Fourier transform (FFT) of the reflected waveform to form the real sensor spectrum; where the processor is further configured with specific computer-executable instructions to: determine a peak in the real sensor spectrum, and estimate the preliminary angle of the target to be an angle at which the peak in the real sensor spectrum occurs; where the processor is further configured with specific computer-executable instructions to predict the intermediate virtual sensor data for the target based on the estimated preliminary angle and a number of virtual sensors that supplement the receiver; where the processor is further configured with specific computer-executable instructions to compute a fast Fourier transform (FFT) of the predicted intermediate virtual sensor data to form the virtual sensor spectrum; where the processor is further configured with specific computer-executable instructions to: determine a peak in the beamformer output, and estimate an angle of the target to be an angle at which the peak in the beamformer output occurs, wherein the user interface depicts an indication of the estimated angle of the target; where the graphical representation comprises an indication of a location of the target; where the receiver is configured to receive the reflected waveform and a second reflected waveform, wherein the second reflected waveform comprises a version of the waveform that reflected off a second target; where the processor is further configured with specific computer-executable instructions to: determine an average of the reflected waveform and the second reflected waveform to determine the real sensor spectrum, identify a first peak in the real sensor spectrum, estimate the preliminary angle of the target to be an angle at which the first peak in the real sensor spectrum occurs, identify a second peak in the real sensor spectrum, estimate a preliminary angle of the second target to be an angle at which the second peak in the real sensor spectrum occurs, predict a second intermediate virtual sensor data for the second target based on the estimated preliminary angle of the second target, and determine an average of the intermediate virtual sensor data and the second intermediate virtual sensor data to form the virtual sensor spectrum; and where the target detection system is one of a radio detection and ranging (RADAR) system, a light detection and ranging (LIDAR) system, a sound navigation and ranging (SONAR) system, an autonomous vehicle, an ultrasound system, a magnetic resonance imaging (MRI) system, or a computing tomography (CT) system.

Another aspect of the disclosure provides a method for detecting a target. The method comprises: as implemented by a target detection system comprising physical hardware, generating a waveform; transmitting the waveform; receiving a reflected waveform, wherein the reflected waveform comprises a version of the waveform that reflected off a target; determining a real sensor spectrum using the reflected waveform; estimating a preliminary angle of the target based on the real sensor spectrum; predicting intermediate virtual sensor data for the target based on the estimated preliminary angle; determining a virtual sensor spectrum using the predicted intermediate virtual sensor data; and combining the real sensor spectrum and the virtual sensor spectrum to form a beamformer output that, when graphically displayed in a user interface, indicates a location at which the target is detected.

The method of the preceding paragraph can include any sub-combination of the following features: where determining a real sensor spectrum further comprises computing a fast Fourier transform (FFT) of the reflected waveform to form the real sensor spectrum; where estimating a preliminary angle of the target further comprises: determine a peak in the real sensor spectrum, and estimating the preliminary angle of the target to be an angle at which the peak in the real sensor spectrum occurs; where the method further comprises: determining a peak in the beamformer output, and estimating an angle of the target to be an angle at which the peak in the beamformer output occurs, wherein the user interface depicts an indication of the estimated angle of the target; where the method further comprises: receiving the reflected waveform and a second reflected waveform, wherein the second reflected waveform comprises a version of the waveform that reflected off a second target, determining an average of the reflected waveform and the second reflected waveform to determine the real sensor spectrum, identifying a first peak in the real sensor spectrum, estimating the preliminary angle of the target to be an angle at which the first peak in the real sensor spectrum occurs, identifying a second peak in the real sensor spectrum, estimating a preliminary angle of the second target to be an angle at which the second peak in the real sensor spectrum occurs, predicting a second intermediate virtual sensor data for the second target based on the estimated preliminary angle of the second target, and determining an average of the intermediate virtual sensor data and the second intermediate virtual sensor data to form the virtual sensor spectrum; and where the target detection system is one of a radio detection and ranging (RADAR) system, a light detection and ranging (LIDAR) system, a sound navigation and ranging (SONAR) system, an autonomous vehicle, an ultrasound system, a magnetic resonance imaging (MRI) system, or a computing tomography (CT) system.

Another aspect of the disclosure provides non-transitory, computer-readable storage media comprising computer-executable instructions for detecting a target, wherein the computer-executable instructions, when executed by a target detection system, cause the target detection system to: transmit a waveform; process a reflected waveform, wherein the reflected waveform comprises a version of the waveform that reflected off a target; determine a real sensor spectrum using the reflected waveform; estimate a preliminary angle of the target based on the real sensor spectrum; predict intermediate virtual sensor data for the target based on the estimated preliminary angle; determine a virtual sensor spectrum using the predicted intermediate virtual sensor data; and combine the real sensor spectrum and the virtual sensor spectrum to form a beamformer output that, when graphically displayed in a user interface, indicates a location at which the target is detected.

The non-transitory, computer-readable storage media of the preceding paragraph can include any sub-combination of the following features: where the computer-executable instructions further cause the target detection system to: determine a peak in the beamformer output, and estimate an angle of the target to be an angle at which the peak in the beamformer output occurs, wherein the user interface depicts an indication of the estimated angle of the target; where the computer-executable instructions further cause the target detection system to: process the reflected waveform and a second reflected waveform, wherein the second reflected waveform comprises a version of the waveform that reflected off a second target, determine an average of the reflected waveform and the second reflected waveform to determine the real sensor spectrum, identify a first peak in the real sensor spectrum, estimate the preliminary angle of the target to be an angle at which the first peak in the real sensor spectrum occurs, identify a second peak in the real sensor spectrum, estimate a preliminary angle of the second target to be an angle at which the second peak in the real sensor spectrum occurs, predict a second intermediate virtual sensor data for the second target based on the estimated preliminary angle of the second target, and determine an average of the intermediate virtual sensor data and the second intermediate virtual sensor data to form the virtual sensor spectrum; and where the target detection system is one of a radio detection and ranging (RADAR) system, a light detection and ranging (LIDAR) system, a sound navigation and ranging (SONAR) system, an autonomous vehicle, an ultrasound system, a magnetic resonance imaging (MRI) system, or a computing tomography (CT) system.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1A:
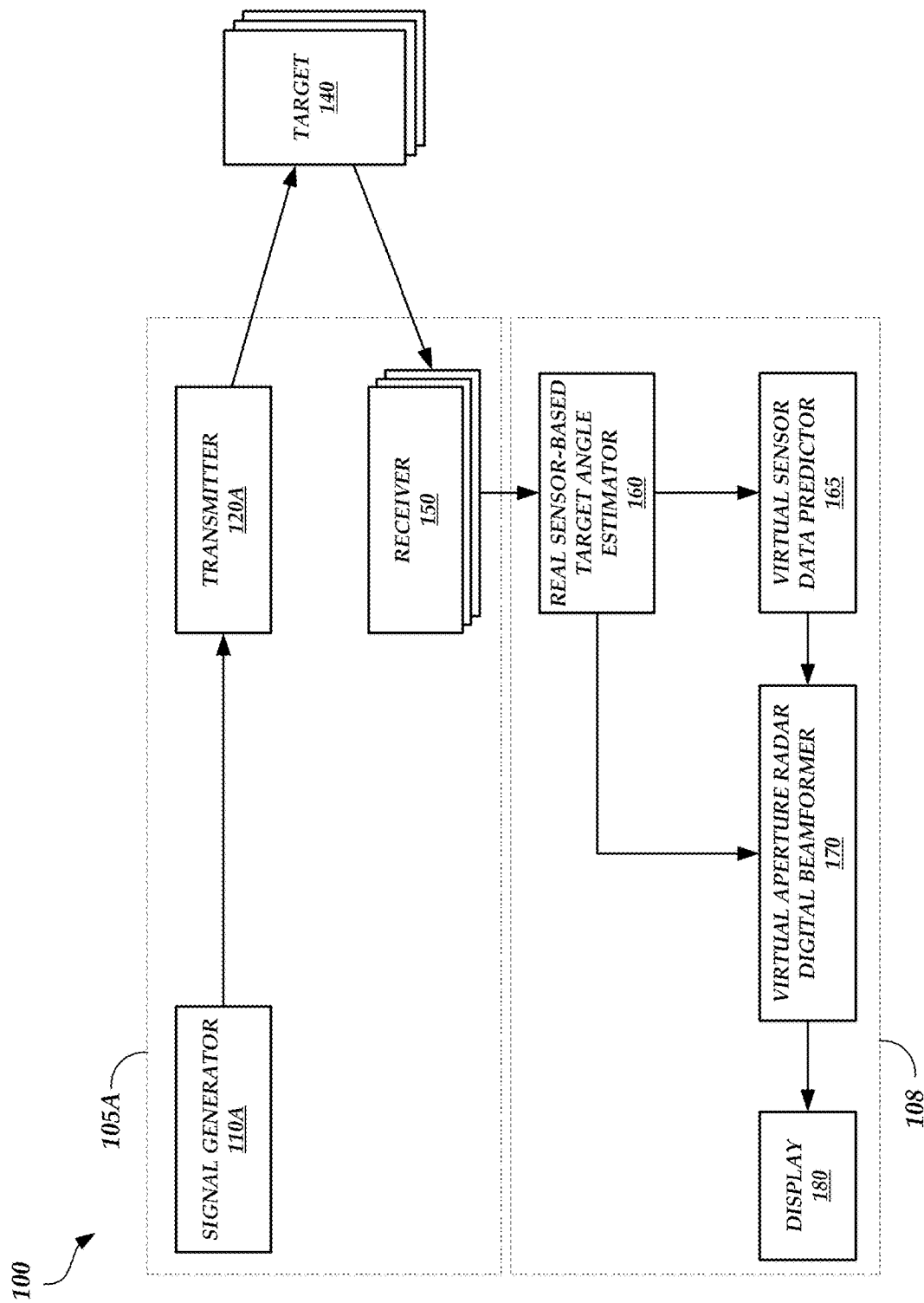
FIGS. 1A-1E are block diagrams of illustrative target detection systems and an illustrative high resolution RF system in a target detection environment.

As described above, conventional pulse compression techniques and FMCW suffer from various limitations and disadvantages. For example, conventional pulse compression techniques include linear frequency modulation (LFM or chirp signal), spread spectrum waveforms (e.g., orthogonal code waveforms), noise waveforms (e.g., pseudorandom number sequences), and/or the like. Examples of orthogonal code waveforms include Walsh-Harr code waveforms and Gold code waveforms. LFM is primarily used in radar detection and in the imaging industry. While LFM provides high resolution detection of stationary or slow-moving targets, LFM suffers from the coupling of range, Doppler effects, and/or other similar issues when targets are moving at a high speed. The Gold code is primarily used for the detection of high speed targets; however, the Gold code does not exhibit the range resolution necessary to provide high resolution detection of stationary or slow-moving targets (e.g., the Gold code has less range resolution than LFM). In addition, noise waveforms can be useful for detecting targets behind walls or other structures, but noise waveforms exhibit stronger background clutter than LFM and other conventional pulse compression techniques.

In addition, the range, Doppler and angle resolution of typical RADAR sensors are proving inadequate for many modern applications, such as automotive radars, security networks for the detection of drone attacks, control systems for the future of increased air traffic, anti-missile defense, noninvasive medical imaging and diagnosis, etc., with more and more complex real-time requirements. Though there has been progress in the fusion of different sensors (visual, LIDAR, RADAR, etc.) with state of the art artificial intelligence (AI) techniques for suppression of unwanted and ghost targets, the solutions are not very effective even though such solutions can be prohibitively computationally expensive. The solutions have provided little improvement in the accuracy of detecting targets (e.g., suppressing unwanted and/or ghost targets), and the design and manufacturing of such sensors is costly. There have been no fundamental discoveries or innovations in improving the accuracy of detecting targets in the last few decades.

One way to improve the accuracy of detecting targets (e.g., a vehicle, such as a plane, helicopter, ship, submarine, automobile, etc.; a human body part, such as a limb, a bone, an organ, a blood vessel, a tumor, etc.; an animal; an extraterrestrial object; a physical structure, such as a building, a roadway, a bridge, etc.; etc.) may be to increase the number of sensors (e.g., receivers, transceivers, etc.) that are used to detect targets at a particular location. However, such a solution may be impractical or impossible. Aside from the high cost to design, manufacture, and deploy the additional sensors, physical space may be an issue. For example, to achieve noticeable improvements in the accuracy of detecting targets, the number of sensors used to detect targets may have to be increased by a factor of 32, 64, or 128. Given the space, size, and/or layout limitations of the land on which sensors are deployed, the medical equipment in which sensors are embedded, the vehicles in which sensors are installed, and/or the like, it may be impractical or impossible to double the number of sensors present therein, let alone increase the number of sensors by a factor of 32, 64, 128, and/or the like.

In fact, some legacy target detection systems may be constructed or installed such that it is impossible to retrofit or modify the target detection systems without rendering the systems inoperative. For example, some legacy target detection systems may have been installed covertly and any actions taken to physically alter the systems may cause the systems to be discovered and become ineffective. As another example, some legacy target detection systems (e.g., MRI machine, CT scanners, etc.) may have a housing that has a certain shape and size to allow for effective signal transmissions. Additional sensors may not fit within the existing housing, and altering the existing housing could render the signal transmissions less effective.

Accordingly, described herein is a high resolution RF system that uses novel, virtual aperture operations to improve the accuracy of detecting targets. In particular, the high resolution RF system described herein can be implemented in or be used in association with medical scanning devices (e.g., implemented within the computer system, coils, magnet, scanner, etc. of MRI machines, implemented within the gantry, X-RAY tube, detector, control console, etc. of computed tomography (CT) scanners, etc.), watercraft like submarines or ships (e.g., as part of the components used for SONAR applications), aircraft (e.g., as part of the components used for RADAR applications), automobiles (e.g., as part of the components used for RADAR and/or LIDAR applications), and/or any other target detection system to improve the accuracy of detecting targets. For example, the high resolution RF system described herein can be implemented in or be used in association with any of the example use cases described in FIGS. 9 through 14, such as in any legacy RADAR system, any legacy LIDAR system, any legacy SONAR system, any legacy ultrasound system, any legacy MRI system, any legacy CT system, any pulse or continuous waveform compression system that generates signals or waveforms to detect objects (e.g., RADAR, LIDAR, SONAR, ultrasound, MRI, CT scans, non-destructive inspections, and/or the like), and/or the like.

The high resolution RF system improves upon prior target detection systems by providing a postprocessing solution that does not require augmenting typical or legacy target detection system hardware with additional hardware components and/or functionality. In other words, the high resolution RF system does not require additional sensors to be installed to provide the target detection improvements described herein. Rather, the high resolution RF system described herein can achieve the target detection accuracy improvement without modification to the hardware of any typical or legacy target detection system within which the high resolution RF system is implemented or with which the high resolution RF system is used.

As an example, the high resolution RF system can achieve the technical benefits described herein by postprocessing one or more received RF echo signals, such as signal(s) or waveform(s) detected by one or more sensors or receivers that reflected off of one or more targets. The postprocessing may involve performing one or more virtual aperture operations, which may include processing the received RF echo signal(s) (referred to herein as "real sensor data"), predicting sensor data that may be generated if the target detection system included additional sensors or receivers that are not otherwise present (which is referred to herein as "virtual sensor data"), processing the virtual sensor data, and combining the processed real sensor data and the processed virtual sensor data to form a digital beamformer output. The high resolution RF system can then cause the digital beamformer output to be displayed in a user interface, which may depict an indication of an angle, range, and/or other characteristic of one or more targets that are detected. For example, high resolution RF system may cause the displayed digital beamformer output to be annotated to indicate angle(s) at which target(s) are detected.

The postprocessing operations (e.g., the virtual aperture operations) can be performed entirely in software running on existing hardware components of a target detection system, in firmware specially configured to instruct existing hardware components of a target detection system to perform the processing, and/or in software or firmware running on a server or other computing device in communication with the existing hardware component(s) of a target detection system. Thus, the high resolution RF system can be implemented as software or firmware running on existing hardware components of a target detection system, or as software or firmware running on a server or other computing device that is in communication with the target detection system (e.g., via a wired or wireless network, such as a local area network, a wireless area network, a cellular network, a private network, a secure tunnel, an encrypted connection, etc.).

The high resolution RF system can implement the postprocessing in real-time (e.g., within a few seconds, within a few milliseconds, within a few microseconds, within a few nanoseconds, etc., of an RF echo signal being received by a sensor or receiver; within a few seconds, within a few milliseconds, within a few microseconds, within a few nanoseconds, etc., of a pulse or continuous waveform being transmitted by a transmitter of a target detection system (e.g., a RADAR system, a LIDAR system, a SONAR system, a medical scanning device, a vehicle, etc.); etc.). Images produced by the high resolution RF system can be displayed by a computing device in place of images produced by a typical or legacy target detection system. Optionally, images produced by a typical or legacy target detection system can be displayed concurrently (e.g., side-by-side) with images produced by the high resolution RF system. In some cases, the images produced by the high resolution RF system may be anywhere between 2x-10x more accurate (e.g., have an image resolution 2 to 10 times better depending on the context and types of sensor data in the field) in terms of angle measurement than the images produced by the typical or legacy target detection system.

While the present disclosure describes target detection systems that generate one or two waveforms for detecting a target, this is not meant to be limiting. For example, the virtual aperture operations described herein can be implemented in or be used with a target detection system that can generate three or more waveforms (e.g., an LFM waveform, a Gold code waveform, an enhanced waveform, and/or FMCW).

The functionality of the high resolution RF system described herein can be implemented in a variety of use cases. For example, the virtual aperture operations described herein as being used by the high resolution RF system can be used in a manner as described herein to detect targets in RADAR, LIDAR, SONAR, autonomous vehicles (e.g., automobiles, trucks, ships, aircraft, unmanned systems, drones, etc.), ultrasound, MRI, CT applications, and/or any other application in which a signal is emitted, the signal reflects off a target, and the reflected signal is captured and processed to detect the target. Thus, the virtual aperture operations described herein are not necessarily limited to implementation within target detection systems that generate waveforms as radio signals. The virtual aperture operations described herein can be implemented in or be used with a target detection system that may include different types of transducers (e.g., antennas, lasers, electro-acoustic transducers, transducer probes, X-RAY tubes, etc.) that can output the generated waveforms in any medium (e.g., air, water, etc.) and receive reflected waveforms that travel through any medium.

The foregoing aspects and many of the attendant advantages of this disclosure will become more readily appreciated as the same become better understood by reference to the following detailed description, when taken in conjunction with the accompanying drawings.

Example High Resolution RF Systems Using Virtual Aperture Postprocessing

FIGS. 1A-1E are block diagrams of illustrative target detection systems 105A-105E and an illustrative high resolution RF system 108 in a target detection environment 100. As illustrated in FIG. 1A, the target detection system 105A includes a signal generator 110A, a transmitter 120A, and one or more receivers 150. The high resolution RF system 108 includes a real sensor-based target angle estimator 160, a virtual sensor data predictor 165, a virtual aperture radar digital beamformer 170, and an optional display 180. The operations performed by the real sensor-based target angle estimator 160, the virtual sensor data predictor 165, and/or the virtual aperture radar digital beamformer 170 may be collectively referred to herein as virtual aperture operations, virtual aperture radar processing operations, or virtual aperture postprocessing. The target detection environment 100 further includes one or more targets 140.

The target detection system 105A and the high resolution RF system 108 may communicate with each other via a network. Alternatively, some or all of the functionality of the high resolution RF system 108 can be implemented in the target detection system 105A.

The signal generator 110A may be configured to generate one or more different types of waveforms. For example, the signal generator 110A can generate an LFM waveform, a Gold code waveform, a Barker code waveform, a noise waveform, an enhanced waveform (e.g., a partially randomized version of the LFM waveform, a partially randomized version of the Gold code waveform, a partially randomized version of a noise waveform, a partially randomized version of a pseudorandom number code waveform, a partially randomized version of the Barker code waveform, and/or a partially randomized version of any other poly-phase code waveform), and/or any other poly-phase code waveform. The signal generator 110A can generate an RF pulse waveform and/or an RF continuous waveform. In the embodiment of FIG. 1A, the signal generator 110A generates an RF pulse waveform. In addition, the waveforms may be generated by the signal generator 110A at any frequency (e.g., radio frequencies, ultrasound frequencies, microwave frequencies, X-RAY frequencies, millimeter wave frequencies, etc.). The signal generator 110A can repeat this process any number of times (e.g., until target detection is paused or stopped) to generate multiple individual pulse waveforms and/or to generate a continuous waveform.

The signal generator 110A can output the generated waveform to the transmitter 120A for transmission via an antenna. The antenna of the transmitter 120A can be any type of antenna, such as a television antenna, a radio antenna, phased array antennas, a parabolic dish antenna, an RF coil used in MRI applications (e.g., a coil used in a medical scanning device like an MRI machine), and/or the like. Alternatively, the transmitter 120A can directly output the generated waveform without an antenna. For example, the transmitter 120A may include a transducer, such as a laser used in LIDAR applications, an electro-acoustic transducer used in SONAR applications, a transducer probe that transmits acoustic signals (e.g., sound waves) for use in ultrasound applications, an X-RAY tube used in CT applications, and/or the like. In some embodiments, a waveform generated by the signal generator 110A can be stored locally in the target detection system 105A in memory. Thus, instead of the signal generator 110A repeatedly generating the waveform and providing the waveform to the transmitter 120A, the transmitter 120A can simply obtain or retrieve a copy of the generated waveform from the local memory each time the transmitter 120A is instructed or caused to output the generated waveform.

In some embodiments, the waveforms generated by the signal generator 110A are digital signals. Thus, the signal generator 110A and/or transmitter 120A may include a digital-to-analog converter (DAC) through which the waveforms pass such that analog versions of the waveforms can be transmitted optionally via an antenna. In other embodiments, the waveforms generated by the signal generator 110A are analog signals and therefore may not pass through a DAC before being transmitted.

The transmitted RF waveform can reflect off the target(s) 140, and the reflected RF waveform(s) (e.g., the RF echo(s)) can be received by the receiver(s) or sensor(s) 150. As an example, the receiver(s) 150 can be any signal reception device, such as any type of antenna (e.g., an RF antenna included in RADAR machines or medical scanning devices), a photodetector used in LIDAR applications, a hydrophone used in SONAR applications, a transducer probe that receives sound waves for use in ultrasound applications, and/or X-RAY detectors used in CT applications. The receiver(s) 150 may include an analog-to-digital converter (ADC) to convert the RF echo(s) from an analog signal format to a digital signal format. The receiver(s) 150 may then pass the digital version of the RF echo(s) to the real sensor-based target angle estimator 160. The real sensor-based target angle estimator 160 may also optionally receive the RF pulse waveform and/or continuous waveform from the signal generator 110A (or from local memory if stored therein).

The real sensor-based target angle estimator 160 can convert the digital version of the RF echo(s) (also referred to herein as the real sensor data) from the time domain to a frequency domain. For example, the real sensor-based target angle estimator 160 can combine the digital version of the RF echo(s), such as by taking an average of the digital version of the RF echo(s). As an illustrative example, the nth sample of a digital version of an RF echo reflected from a particular target 140 may be represented by the following equation:

$$s_{n,l}(k) = x(k)^{-j\left(\frac{2k\pi d}{\lambda}\right)\cos\theta_l} + \eta(k) \quad (1)$$

where k represents a receiver 150 and is a value between 1 and $M_r$ (with $M_r$ representing the number of receivers 150 that are present in the target detection system 105A), l represents a target 140 and is a value between 1 and T (with T representing the number of targets 140 that are detected), x(k) is the nth sample of the RF echo detected by the receiver 150k that reflected off the target l, and η(k) represents noise (e.g., additive white Gaussian noise) associated with the receiver 150k. The real sensor-based target angle estimator 160 can add together $s_{n,1}(k)$, $s_{n,2}(k)$, $s_{n,3}(k)$, ... $s_{n,T}(k)$ (e.g., add together the nth sample $s_n(k)$ for each target 140), and divide the sum by the number of targets 140 (e.g., divide by T). The resulting value may be the nth sample of a combined digital version of the RF echo(s). The real sensor-based target angle estimator 160 can then determine or compute a fast Fourier transform (FFT) of the nth sample of the combined digital version of the RF echo(s) and/or the FFT of zero or more other samples of the combined digital version of the RF echo(s) to form a real sensor spectrum (e.g., $S_r$).

The real sensor-based target angle estimator 160 can use the real sensor spectrum to estimate a preliminary angle for each target 140. For example, the real sensor-based target angle estimator 160 can determine or compute a maxima on the spectrum $S_r$ to estimate the preliminary angle for each target 140, where the number of maxima may be T (and thus each maxima may indicate a preliminary angle for one of the detected target(s) 140). The real sensor-based target angle estimator 160 can provide the estimated preliminary angle(s) to the virtual sensor data predictor 165.

The virtual sensor data predictor 165 can predict a vth sample of virtual sensor data for each detected target 140. For example, the target detection system 105A may include a set number of receiver(s) 150. As described above, the accuracy of the target detection could be improved if the number of receiver(s) 150 present in the target detection system 105A could be increased. However, as explained above, it may be impractical or impossible to add additional receiver(s) 150 to the target detection system 105A due to, for example, space, size, and/or layout constraints at a location at which the additional receiver(s) 150 would be present. To improve the accuracy of the target detection despite this physical limitation, the high resolution RF system 108 can be configured to predict sensor data for one or more additional receivers or sensors that do not currently exist in the target detection system 105A and combine the predicted sensor data with the real sensor data (e.g., the sensor data originating from the existing receiver(s) 150). The additional receivers or sensors that do not currently exist in the target detection system 105A but that for which sensor data is predicted are referred to herein as virtual sensors or virtual receivers. The high resolution RF system 108 may effectively simulate one or more physical sensors or receivers to compensate for the fact that additional, physical sensors or receivers 150 cannot be or are not added to the existing target detection system 105A. Because the high resolution RF system 108 may effectively simulate one or more physical sensors, the space, size, or physical layout constraints described above are no longer an issue. Thus, the high resolution RF system 108 can simulate hundreds to thousands of physical sensors, predicting virtual sensor data for each. The high resolution RF system 108 can essentially obtain data for 32, 64, 128, etc. times the number of receivers 150 that are actually present in the target detection system 105A. As a result, the high resolution RF system 108 can achieve noticeable improvements in the accuracy of detecting targets.

For example, the virtual sensor data predictor 165 can predict virtual sensor data using the preliminary angle(s) estimated by the real sensor-based target angle estimator 160. In an embodiment, the virtual sensor data predictor 165 can use the preliminary angle(s) estimated by the real sensor-based target angle estimator 160 as follows to predict a vth sample of the virtual sensor data for a particular detected target 140:

$$s_{v,l}(k+m) = s(m) * \cos\left(\frac{2\pi d(k-1)M_r + m\theta_l}{\lambda}\right) - \sqrt{1-s(m)^2}\sin\left(\frac{2\pi d(k-1)M_r + m\theta_l}{\lambda}\right) \quad (2)$$

where k represents a receiver 150 and is a value between $M_r+1$ and $M_r+M_v$ (with $M_v$ representing the number of virtual sensors, which can be automatically set or user-defined), where l represents a target 140 and is a value between 1 and T (with T representing the number of targets 140 that are detected), $\theta_l$ represents the lth preliminary angle estimate (e.g., the preliminary angle estimated for target l), s(m) represents a sample at the mth virtual sensor in the $M_v$ virtual sensors, and m represents a virtual sensor in the $M_v$ virtual sensors and has a value that can be any integer (e.g., 5, 14, 20, 50, 64, 100, 221, 512, 1024, 2048, 4096, etc.).

The virtual sensor data predictor 165 can combine the vth samples of the virtual sensor data to form a vth sample of a combined virtual signal. For example, the virtual sensor data predictor 165 can add together $s_{v,1}(k+m)$, $s_{v,2}(k+m)$, $s_{v,3}(k+m)$, ... $s_{v,T}(k+m)$ (e.g., add together the vth sample $s_v(k+m)$ for each target 140), and divide the sum by the number of targets 140 (e.g., divide by T). The resulting value may be the vth sample of a combined virtual signal. The virtual sensor data predictor 165 can then determine or compute a FFT of the vth sample of the combined virtual signal and/or the FFT of zero or more other samples of the combined virtual signal to form a virtual sensor spectrum (e.g., $S_v$). The virtual sensor data predictor 165 can provide the virtual sensor spectrum to the virtual aperture radar digital beamformer 170. In addition, the real sensor-based target angle estimator 160 can provide the real sensor spectrum to the virtual aperture radar digital beamformer 170.

The virtual aperture radar digital beamformer 170 can use the real sensor spectrum and the virtual sensor spectrum to produce a digital beamformer output. For example, the virtual aperture radar digital beamformer 170 can combine the real sensor spectrum and the virtual sensor spectrum (e.g., take a product of the real sensor spectrum, $S_r$, and the virtual sensor spectrum, $S_v$) to form a combined sensor spectrum. The combined sensor spectrum may represent a digital beamformer output.

The virtual aperture radar digital beamformer 170 can optionally use the digital beamformer output to estimate an angle for each target 140. For example, the virtual aperture radar digital beamformer 170 can determine or compute a maxima on the combined sensor spectrum to estimate the angle for each target 140, where the number of maxima may be T (and thus each maxima may indicate an angle for one of the detected target(s) 140).

The virtual aperture radar digital beamformer 170 can provide the digital beamformer output, an indication of the determined maxima, and/or an indication of the estimated angle(s) for the detected target(s) 140 to the optional display 180 such that one or more waveforms can be plotted on a graph in a user interface (optionally annotated to indicate the estimated angle(s) and/or location(s) of the detected target(s) 140) to provide a user with a visual representation of one or more detected targets 140 (if a target is detected). For example, the virtual aperture radar digital beamformer 170 can use the digital beamformer output produced using one or more samples to generate a range-Doppler movie or animation that can be displayed in the user interface visible using the display 180, where the range-Doppler movie provides a real-time or nearly real-time (e.g., within a few nanoseconds, within a few microseconds, within a few milliseconds, etc. of real-time) graphical representation of a past and/or current location of one or more detected targets 140. Alternatively, the virtual aperture radar digital beamformer 170 can transmit the digital beamformer output, an indication of the determined maxima, an indication of the estimated angle(s) for the detected target(s) 140, and/or a generated range-Doppler movie or animation to a display external to the target detection system 105A and/or high resolution RF system 108 for display in a user interface.

Each time the receiver(s) 150 receive or detect an RF echo, the operations described herein as being performed by the real sensor-based target angle estimator 160, the virtual sensor data predictor 165, the virtual aperture radar digital beamformer 170, and/or the display 180 can be performed. Thus, the operations described herein as being performed by the real sensor-based target angle estimator 160, the virtual sensor data predictor 165, the virtual aperture radar digital beamformer 170, and/or the display 180 can be performed each time the transmitter 120A transmits an RF pulse or continuous waveform. As a result, the digital beamformer output displayed by the display 180 and/or another display may be periodically or continuously updated as new reflections are received.

In an embodiment, the signal generator 110A, the transmitter 120A, the receiver(s) 150, and/or the display 180 may be existing software, hardware, and/or firmware components in a target detection system, such as a RADAR system, a LIDAR system, a SONAR system, etc. The real sensor-based target angle estimator 160, the virtual sensor data predictor 165, and/or the virtual aperture radar digital beamformer 170, however, may represent software and/or firmware modifications to the target detection system. In other words, the real sensor-based target angle estimator 160, the virtual sensor data predictor 165, and/or the virtual aperture radar digital beamformer 170 may be additional components that perform postprocessing on the output of a legacy or typical target detection system and/or on waveforms detected by the legacy or typical target detection system (e.g., the RF echo). Thus, the hardware of the target detection system may remain unchanged, yet the target detection system may now provide higher resolution (e.g., more accurate) target detection results given the postprocessing provided by the real sensor-based target angle estimator 160, the virtual sensor data predictor 165, and/or the virtual aperture radar digital beamformer 170.

In another embodiment, the signal generator 110A, the transmitter 120A, the receiver(s) 150, and/or the display 180 may be existing software, hardware, and/or firmware components in a target detection system, such as a RADAR system, a LIDAR system, a SONAR system, etc. The real sensor-based target angle estimator 160, the virtual sensor data predictor 165, and/or the virtual aperture radar digital beamformer 170, however, may represent software and/or firmware operations performed on a computing device, such as a server, that is in networked communication with a legacy or typical target detection system. The legacy or typical target detection system may already be in networked communication with the computing device. Thus, the functionality of the real sensor-based target angle estimator 160, the virtual sensor data predictor 165, and/or the virtual aperture radar digital beamformer 170 described herein can supplement or replace the existing functionality of this existing computing device.

While the display 180 is depicted as being internal to the high resolution RF system 108, this is not meant to be limiting. The display 180 may alternatively be internal to the target detection system 105A, may be external to the high resolution RF system 108 (e.g., may be coupled to the high resolution RF system 108 directly or indirectly via a cable, a wireless connection, or a networked connection), may be external to the target detection system 105A (e.g., may be coupled to the target detection system 105A directly or indirectly via a cable, a wireless connection, or a networked connection), and/or the like. For example, the display 180 could be a monitor, touch screen, or other type of display coupled to the target detection system 105A and/or the high resolution RF system 108, could be embedded within a computing device (e.g., a mobile device, a laptop, a workstation, a desktop, a tablet, another target detection system, a server, etc.) in networked communication with the target detection system 105A and/or the high resolution RF system 108, and/or the like.

Figure 1B:
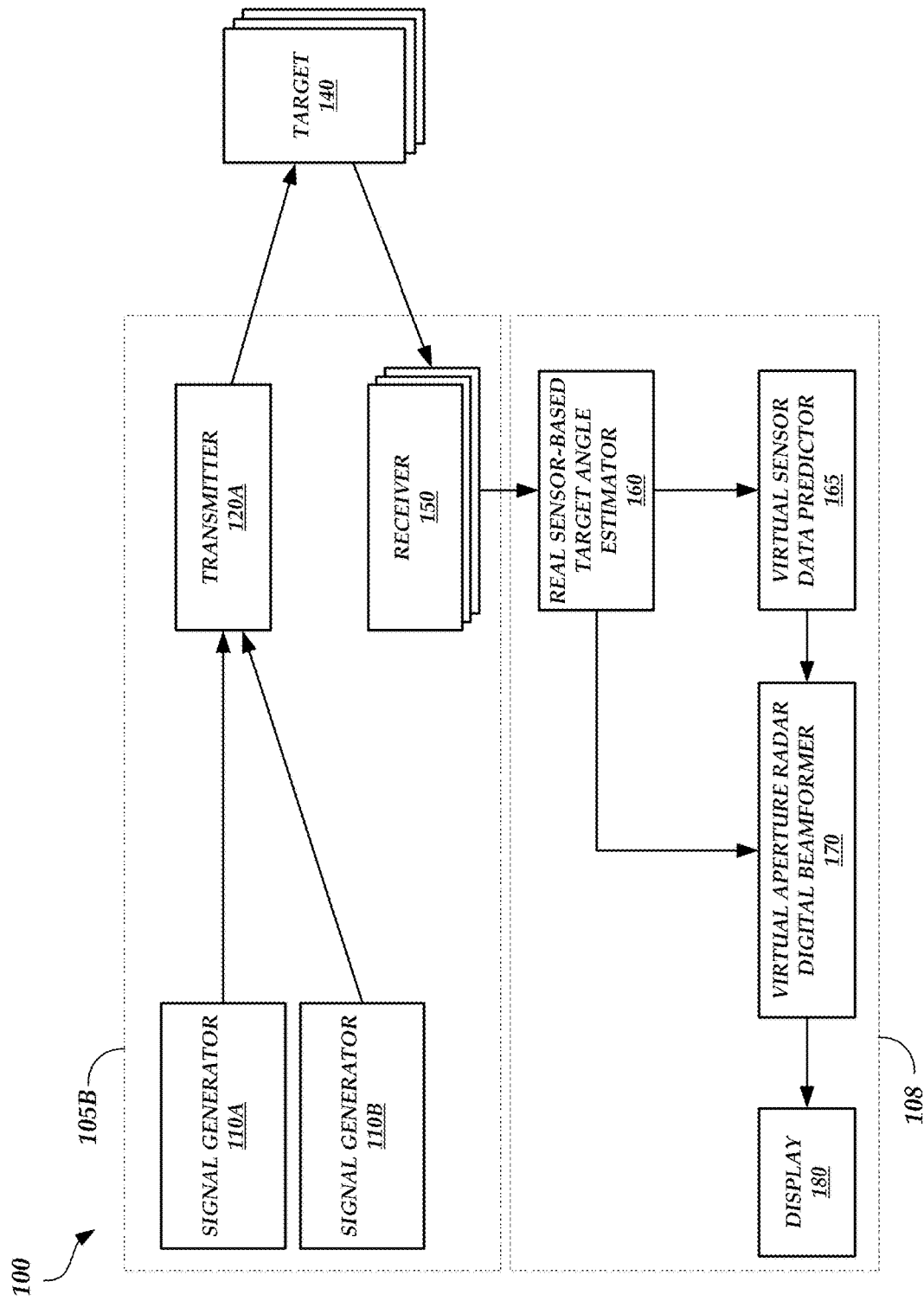

As illustrated in FIG. 1B, target detection system 105B includes the transmitter 120A and the receiver(s) 150. However, unlike the target detection system 105A, the target detection system 105B does not include just the signal generator 110A. Rather, the target detection system 105B includes the signal generator 110A and a signal generator 110B. The signal generator 110A can be configured to generate a poly-phase code waveform (e.g., the LFM waveform). The signal generator 110B can be configured to generate an enhanced waveform, such as in a manner described in U.S. Pat. No. 9,759,810, entitled "HYBRID PULSE COMPRESSION WAVEFORM FOR HIGH RESOLUTION IMAGING," which is hereby incorporated by reference herein in its entirety.

The signal generator 110A and the signal generator 110B can generate the respective waveforms sequentially, in parallel, and/or overlapping in time. The signal generators 110A-110B can output the respective generated waveforms to the transmitter 120A for transmission in a manner as described above with respect to the target detection system 105A. For example, the transmitter 120A can transmit the generated poly-phase code waveform followed by the generated enhanced waveform, or vice-versa. In some embodiments, the transmitter 120A includes a buffer to store the generated waveforms such that the waveforms can be transmitted in sequence even if the waveforms are received from the signal generator 110A and the signal generator 110B at the same time or at nearly the same time. The transmitter 120A may further delay transmission of the second waveform (e.g., the enhanced waveform) such that there is a period of time between transmission of the first waveform (e.g., the LFM waveform) and the second waveform in which no transmissions are made.

Figure 1C:
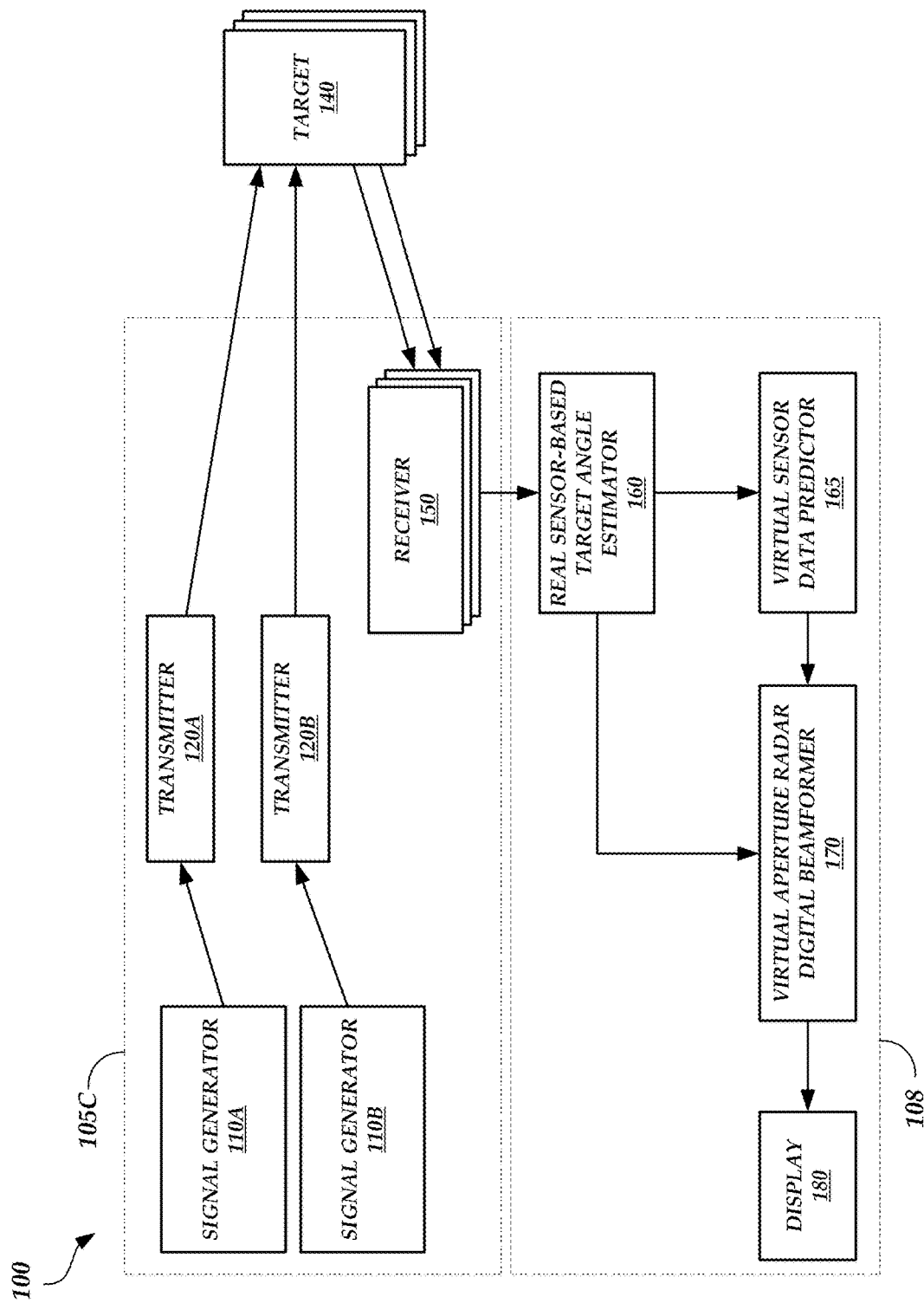

As illustrated in FIG. 1C, target detection system 105C includes the signal generator 110A, the signal generator 110B, the transmitter 120A, and the receiver(s) 150. Unlike the target detection systems 105A-105B, the target detection system 105C also includes a transmitter 120B. For example, the target detection system 105C may implement a multiple input single output (MISO) design such that the generated poly-phase code waveform is transmitted via the transmitter 120A and the generated enhanced waveform is transmitted via a separate transmitter 120B. The reflected poly-phase code and enhanced waveforms may then be received by a single receiver 150. In other embodiments, the target detection system 105C can implement a multiple input multiple output (MIMO) design such that the generated poly-phase code waveform is transmitted via the transmitter 120A, the generated enhanced waveform is transmitted via a separate transmitter 120B, the reflected poly-phase code waveform is received by a first receiver 150, and the reflected enhanced waveform is received by a separate second receiver 150.

Figure 1D:
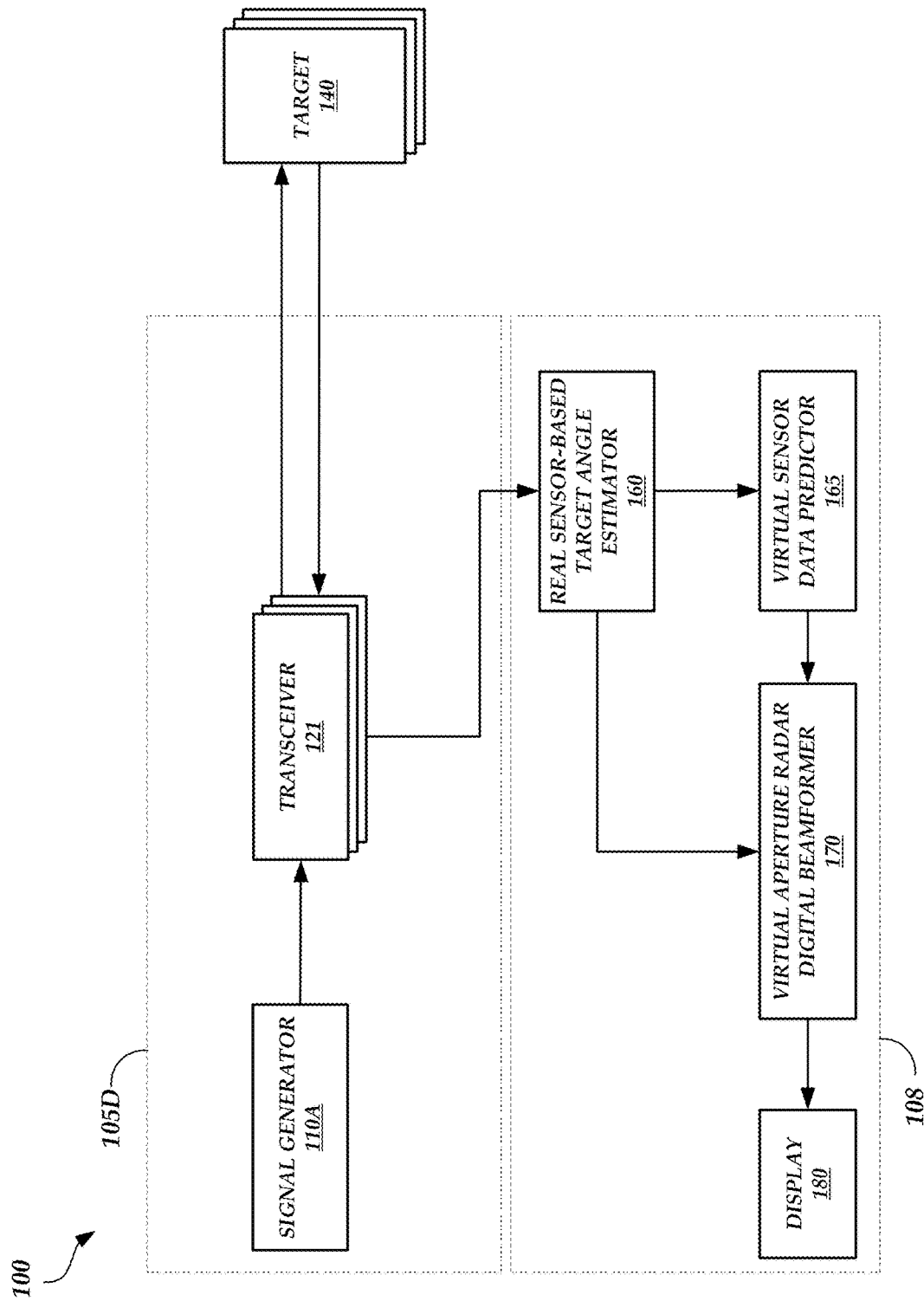

As illustrated in FIG. 1D, target detection system 105D includes the signal generator 110A. However, instead of a separate transmitter 120A and/or separate receiver(s) 150, the target detection system 105D includes one or more transceivers 121 that each perform the functionality of the transmitter 120A and a receiver 150.

Figure 1E:
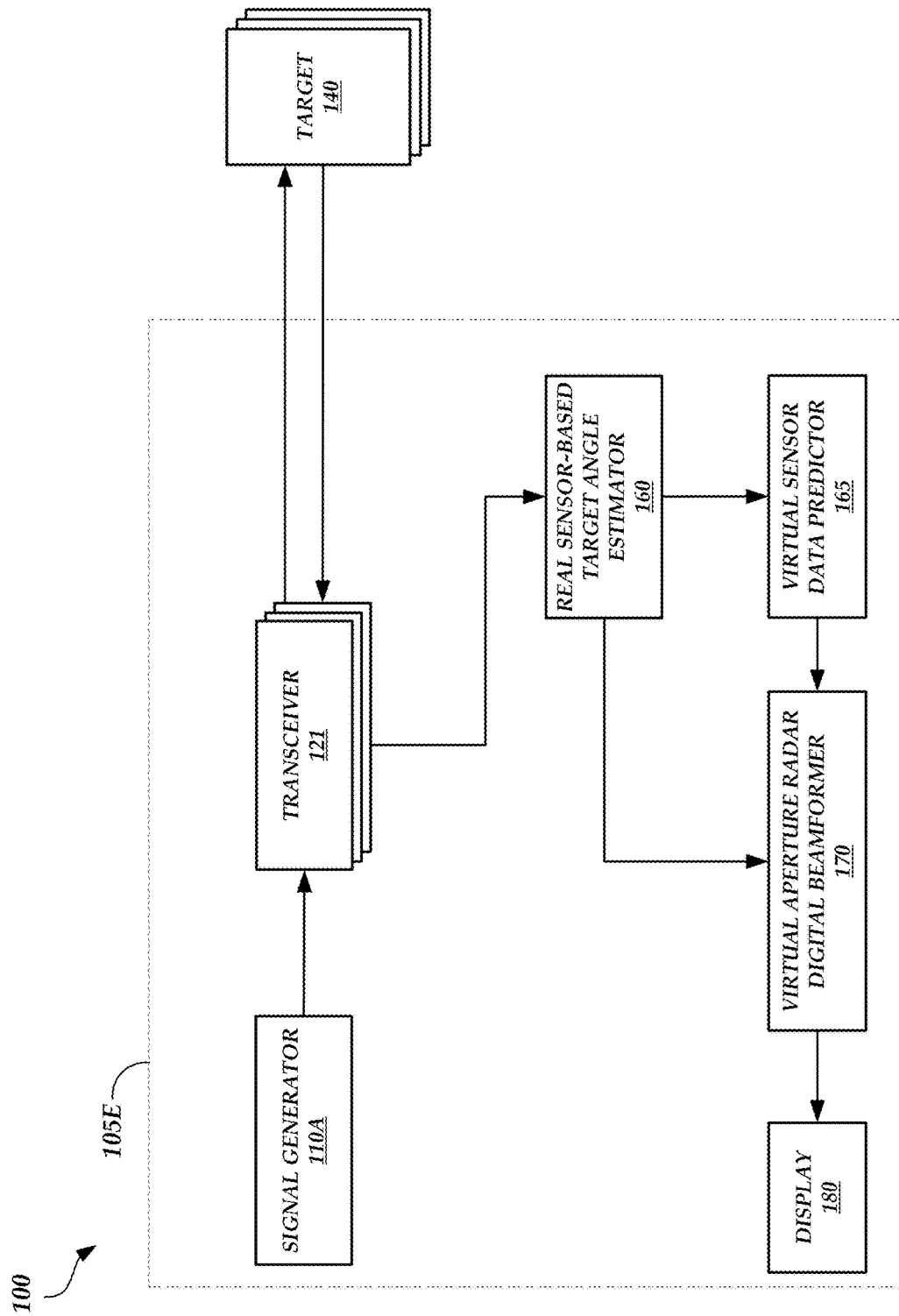

As illustrated in FIG. 1E, target detection system 105E includes the signal generator 110A and the transceiver(s) 121. However, a separate high resolution RF system 108 is no longer present. Rather, the real sensor-based target angle estimator 160, the virtual sensor data predictor 165, the virtual aperture radar digital beamformer 170, and/or the optional display 180 are depicted as being internal to the target detection system 105E While FIGS. 1A-1F disclose specific embodiments of the target detection systems 105A-105E and the high resolution RF system 108, this is not meant to be limiting. For example, the target detection system 105A may include any components or implement any features disclosed in the other target detection systems 105B-105E and the same may apply to the other target detection systems 105B-105E. As an illustrative example, instead of including the transmitter 120A and the receiver(s) 150, the target detection system 105B may include the transceiver 121.

Furthermore, the target detection systems 105A-105E can include any number of transmitters 120, receivers 150, and/or transceivers 121. In addition, the target detection systems 105A-105E and/or high resolution RF system 108 can include or be coupled to any number of displays 180.

The target detection systems 105A-105E may each include physical hardware, such as memory (e.g., a hard disk, a solid state drive, flash memory, random access memory (RAM), etc.), one or more processors, transmit circuitry, receive circuitry, oscillators, buffers, one or more DACs, one or more ADCs, one or more antennas and/or transducers, hydrophones, microphones, a display (e.g., LED display, LCD display, plasma display, etc.), and/or the like to implement the functionality described herein. Similarly, the high resolution RF system 108, if implemented within a separate system or computing device, may include physical hardware, such as memory (e.g., a hard disk, a solid state drive, flash memory, random access memory (RAM), etc.), one or more processors, transmit circuitry, receive circuitry, oscillators, buffers, one or more DACs, one or more ADCs, one or more antennas and/or transducers, hydrophones, microphones, a display (e.g., LED display, LCD display, plasma display, etc.), and/or the like to implement the functionality described herein. For example, the memory of a target detection system 105A-105E may store instructions that, when executed by the one or more processors, causes the respective target detection system 105A-105E to implement the functionality of the signal generators 110A and/or 110B, the transmitters 120A and/or 120B, the receiver(s) 150, the transceiver(s) 121, the real sensor-based target angle estimator 160, the virtual sensor data predictor 165, the virtual aperture radar digital beamformer 170, and/or the display 180 described herein. As another example, the memory of the high resolution RF system 108 may store instructions that, when executed by the one or more processors, causes the high resolution RF system 108 to implement the functionality of the real sensor-based target angle estimator 160, the virtual sensor data predictor 165, the virtual aperture radar digital beamformer 170, and/or the display 180 described herein. Additional details of the components of the target detection systems 105A-105E and/or the high resolution RF system 108 is described below with respect to FIG. 8.

Figure 2:
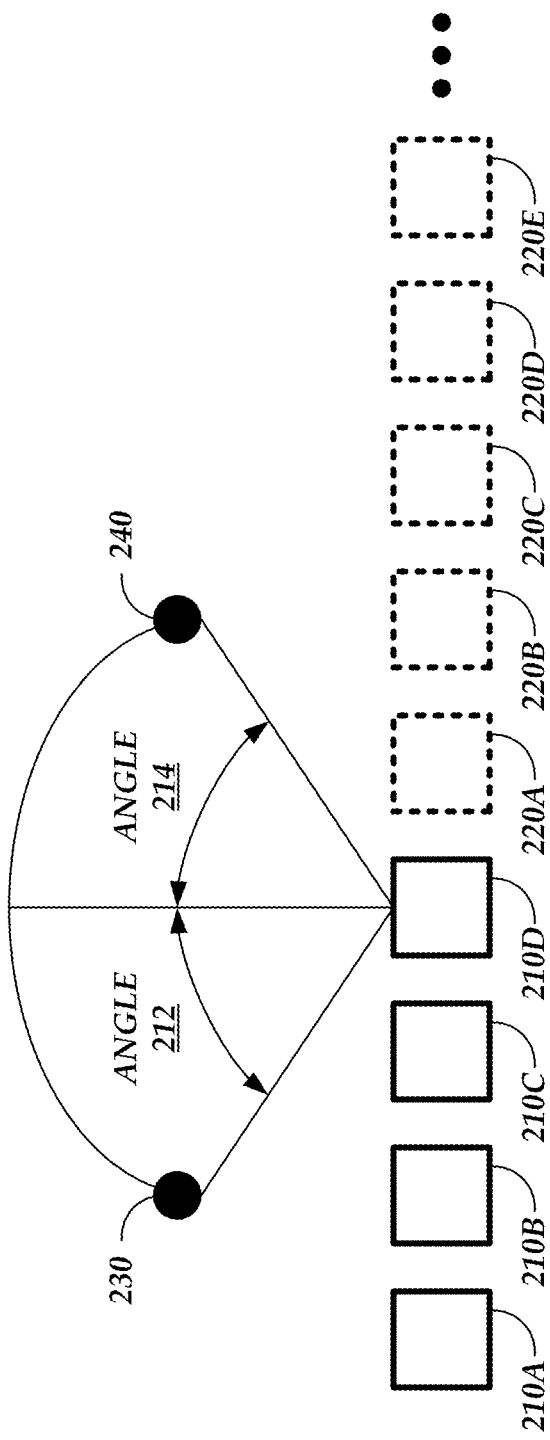
FIG. 2 illustrates a visual representation of real sensors and virtual sensors.

FIG. 2 illustrates a visual representation of real sensors 210A-210D and virtual sensors 220A-220E. As illustrated in FIG. 2, a target detection system may include four real, physical sensors 210A-210D that have a maximum field of view defined by angles 212 and 214. Within the maximum field of view defined by the angles 212 and 214, one or more of the real sensors 210A-210D may detect reflecting signals indicating the presence of a target 230 and a target 240.

While the reflection(s) detected by the one or more real sensors 210A-210D may allow a legacy target detection system to detect the targets 230 and 240, the accuracy of the detection may be poor. For example, the legacy target detection system may process the reflection data, resulting in data indicating that the angle of the target 230 is estimated to be between a large angle range (e.g., within a 15 degree window, within a 30 degree window). As a result, the angle of resolution may be poor, such that the legacy target detection system may begin a single target instead of two separate targets 230 and 240 once the targets 230 and 240 pass within a certain distance of each other. Similarly, the legacy target detection system may fail to detect one or both of the targets 230 and 240 if either or both targets 230 and 240 travel outside the maximum field of view defined by angles 212 and 214.

By predicting virtual sensor data for one or more virtual sensors 220A-220E, a high resolution RF system can increase the maximum field of view of the legacy target detection system and/or reduce the angle of resolution of the legacy target detection system. As a result, the legacy target detection system modified to use the improvements described herein may be able to detect targets 230 and 240 over a wider range of angles and/or may be able to reduce the minimum distance that targets 230 and 240 need to be from each other for detection to be possible. Virtual sensor data can be predicted for any number of virtual sensors 220A-220E, such as 1, 3, 5, 10, 64, 128, 512, 1024, 2048, 4096, etc. virtual sensors 220.

Techniques for Detecting a Target Using Virtual Aperture Operations

Figure 3:
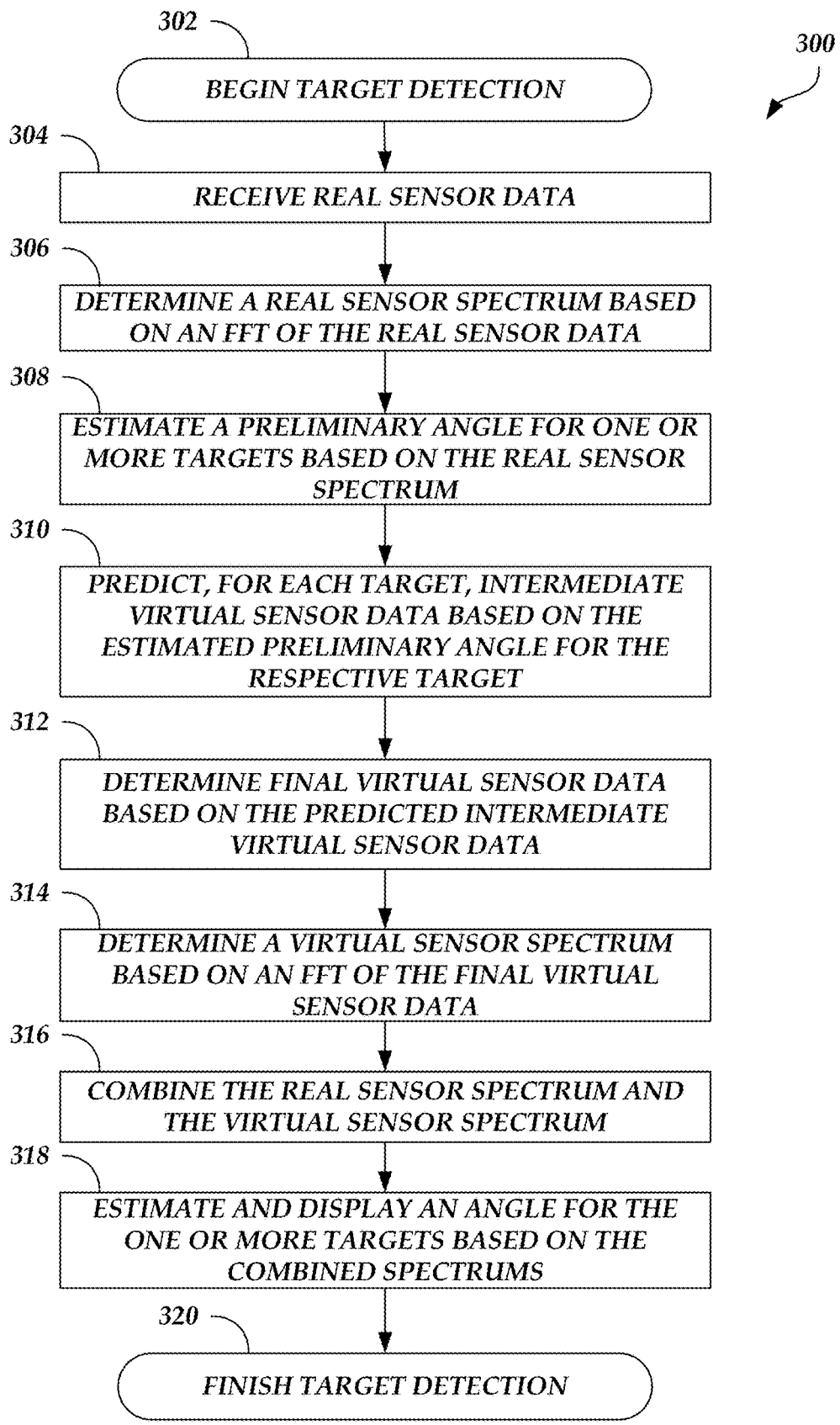
FIG. 3 is a flow diagram depicting a target detection routine illustratively implemented by a high resolution RF system.

FIG. 3 is a flow diagram depicting a target detection routine 300 illustratively implemented by a high resolution RF system. As an example, the high resolution RF system 108 of FIGS. 1A-1D and/or the target detection system 105E of FIG. 1E can be configured to execute the target detection routine 300. The target detection routine 300 begins at block 302.

At block 304, real sensor data is received. For example, the real sensor data may be reflected RF signal(s) or RF echo(s) received by one or more receivers 150 and/or one or more transceivers 121.

At block 306, a real sensor spectrum is determined based on an FFT of the real sensor data. For example, the real sensor data corresponding to different targets can be combined, and an FFT of the combined real sensor data may result in the real sensor spectrum.

At block 308, a preliminary angle for one or more targets is estimated based on the real sensor spectrum. For example, the preliminary angle for each target may be based on a maximum or peak detected in the real sensor spectrum. The real sensor spectrum may have multiple maxima, one for each target.

At block 310, intermediate virtual sensor data is predicted for each target in the one or more targets based on the estimated preliminary angle for the respective target. For example, the intermediate virtual sensor data for a vth sample and for a particular target may be determined using Equation (2).

At block 312, final virtual sensor data is determined based on the predicted intermediate virtual sensor data. For example, the predicted intermediate virtual sensor data for a vth sample and for each target can be combined (e.g., averaged) to form the final virtual sensor data.

At block 314, a virtual sensor spectrum is determined based on an FFT of the final virtual sensor data. Like the real sensor spectrum, the virtual sensor spectrum may be in the frequency domain.

At block 316, the real sensor spectrum and the virtual sensor spectrum are combined. For example, a product may be taken of the real sensor spectrum and the virtual sensor spectrum.

At block 318, an angle for the one or more targets is estimated and displayed based on the combined spectrums. For example, the angle for each target may be based on a maximum or peak detected in the combined spectrums. The combined spectrums may have multiple maxima, one for each target. After the angle for the one or more targets is estimated and displayed, the target detection routine 300 is complete, as shown at block 320.

Figure 4:
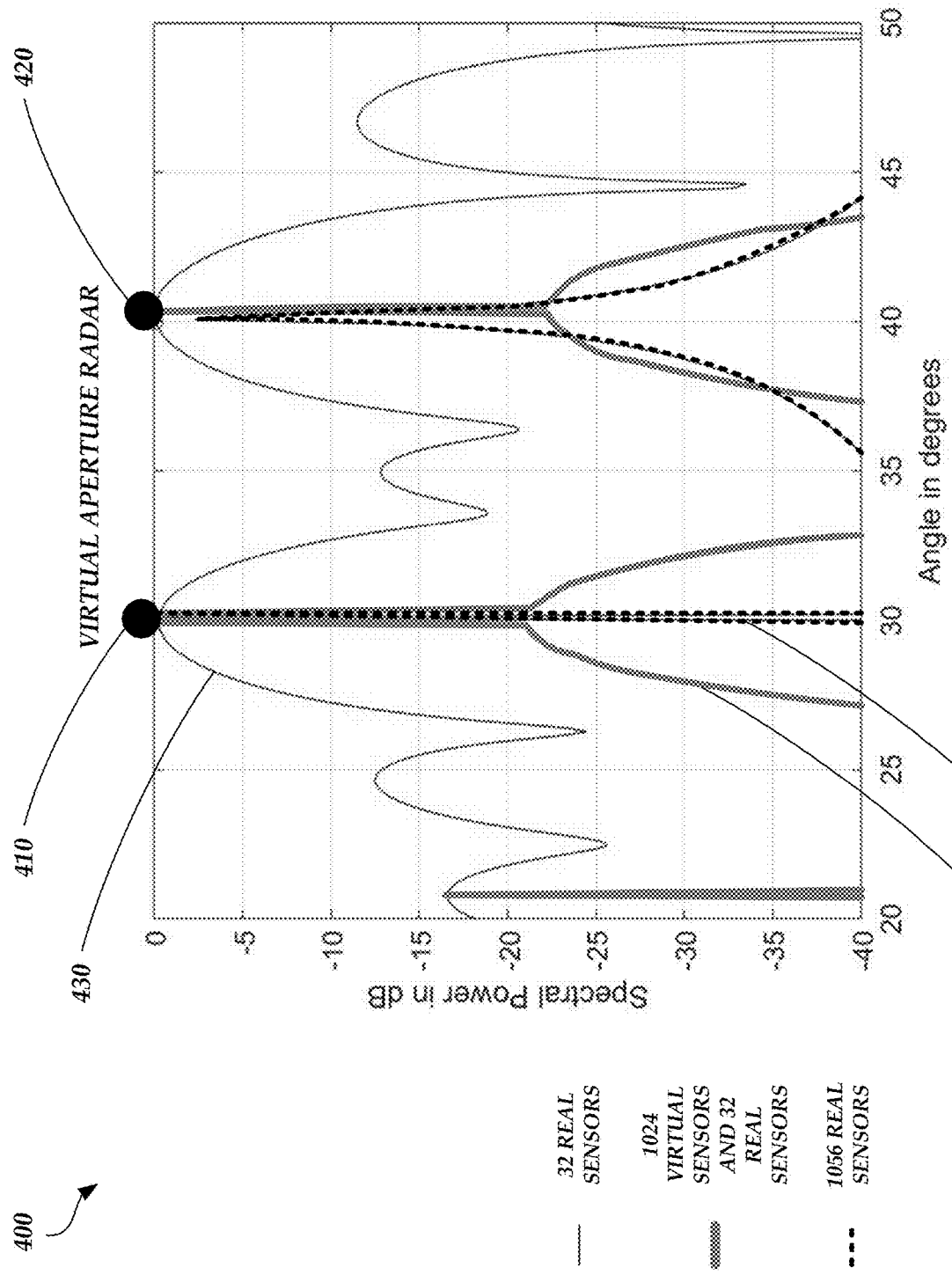
FIG. 4 illustrates a graph depicting target detection using virtual aperture postprocessing and using solely real sensors when targets are 10 degrees apart.

Comparison of Target Detection Using and not Using Virtual Aperture Postprocessing FIG. 4 illustrates a graph 400 depicting target detection using virtual aperture postprocessing and using solely real sensors when targets 410 and 420 are 10 degrees apart. The graph 400 (e.g., line 440) may be similar to an output displayed in a user interface as a result of producing the digital beamformer output. As illustrated in FIG. 4, the targets 410 and 420 are detected at 30° and 40°, respectively.

If a target detection system includes 32 real sensors, line 430 in the graph 400 depicts the target detection results. As illustrated in the graph 400, the line 430 has a peak or maximum at an angle at which the target 410 is present and a peak or maximum at which the target 420 is present. However, the line 430 also has multiple maxima at angles at which no targets are actually present. Target detection using the 32 real sensors is relatively poor.

If the high resolution RF system 108 predicts virtual sensor data for 1024 virtual sensors and combines this data with the real sensor data obtained from the 32 real sensors, line 440 in the graph 400 depicts the target detection results. As illustrated in the graph 400, the line 440 has a peak or maximum at an angle at which the target 410 is present, a peak or maximum at an angle at which the target 420 is present, and no other peaks or maxima. Target detection using the 32 real sensors and the 1024 virtual sensors is considerably more accurate than target detection using just the 32 real sensors.

While the accuracy of the virtual aperture postprocessing degrades slightly at lower spectral power, the results are very similar to the results that would be achieved if 1056 real sensors were actually installed instead of relying on the 32 real sensors and the virtual sensor data for 1024 virtual sensors. Line 450 depicts target detection results using 1056 real sensors. As illustrated in the graph 400, the line 450 has a peak or maximum at an angle at which the target 410 is present, a peak or maximum at an angle at which the target 420 is present, and no other peaks or maxima, and is very similar to the line 440.

Figure 5:
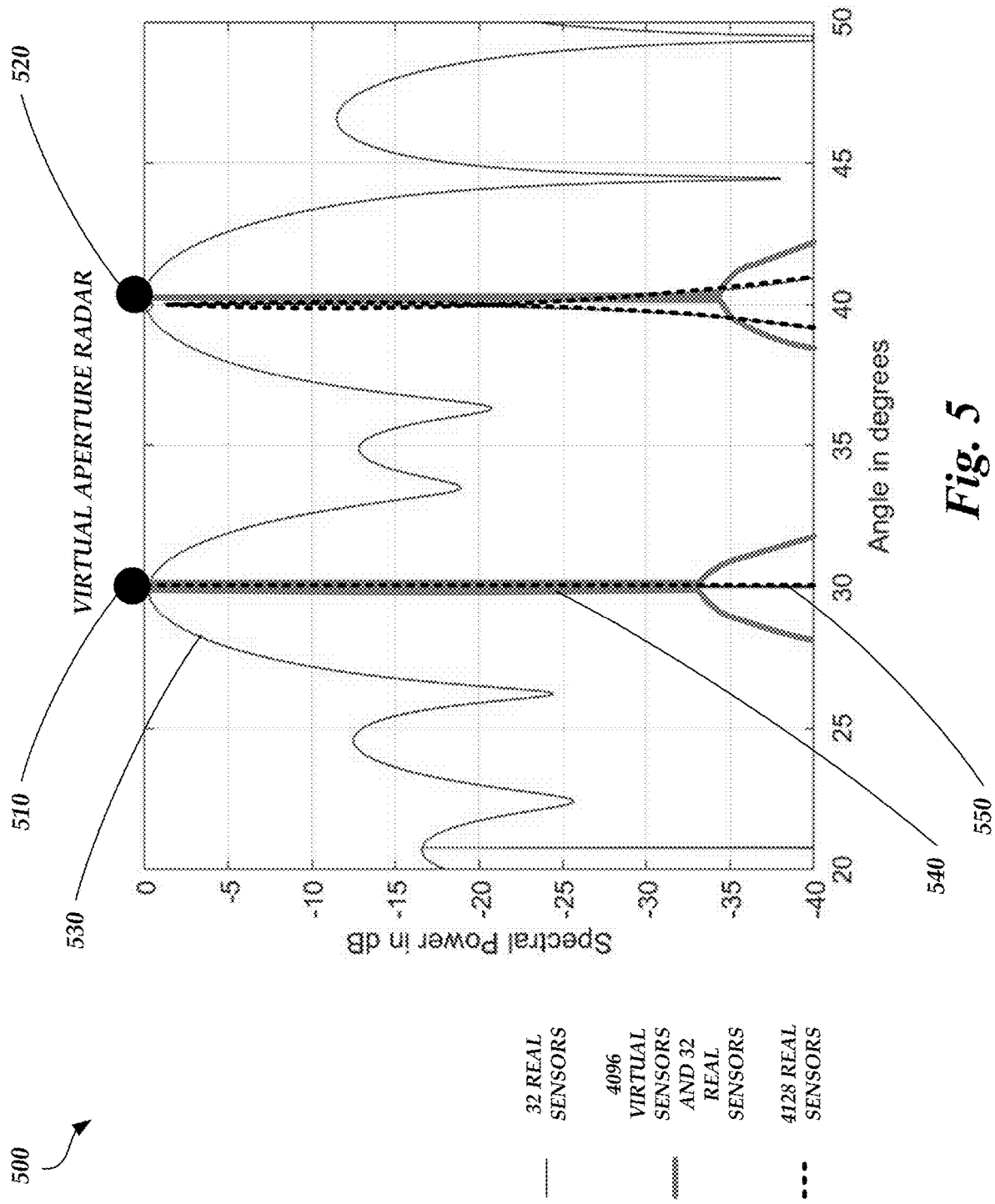
FIG. 5 illustrates another graph depicting target detection using virtual aperture postprocessing and using solely real sensors when targets are 10 degrees apart.

FIG. 5 illustrates another graph 500 depicting target detection using virtual aperture postprocessing and using solely real sensors when targets 510 and 520 are 10 degrees apart. The graph 500 (e.g., line 540) may be similar to an output displayed in a user interface as a result of producing the digital beamformer output. As illustrated in FIG. 5, the targets 510 and 520 are detected at 30° and 40°, respectively.

If a target detection system includes 32 real sensors, line 530 in the graph 500 depicts the target detection results. As illustrated in the graph 500, the line 530 has a peak or maximum at an angle at which the target 510 is present and a peak or maximum at which the target 520 is present. However, the line 530 also has multiple maxima at angles at which no targets are actually present. Target detection using the 32 real sensors is relatively poor.

If the high resolution RF system 108 predicts virtual sensor data for 4096 virtual sensors and combines this data with the real sensor data obtained from the 32 real sensors, line 540 in the graph 500 depicts the target detection results. As illustrated in the graph 500, the line 540 has a peak or maximum at an angle at which the target 510 is present, a peak or maximum at an angle at which the target 520 is present, and no other peaks or maxima. Target detection using the 32 real sensors and the 4096 virtual sensors is considerably more accurate than target detection using just the 32 real sensors.

While the accuracy of the virtual aperture postprocessing degrades slightly at lower spectral power, the results are very similar to the results that would be achieved if 4128 real sensors were actually installed instead of relying on the 32 real sensors and the virtual sensor data for 4096 virtual sensors. Line 550 depicts target detection results using 4128 real sensors. As illustrated in the graph 500, the line 550 has a peak or maximum at an angle at which the target 510 is present, a peak or maximum at an angle at which the target 520 is present, and no other peaks or maxima, and is very similar to the line 540.

Figure 6:
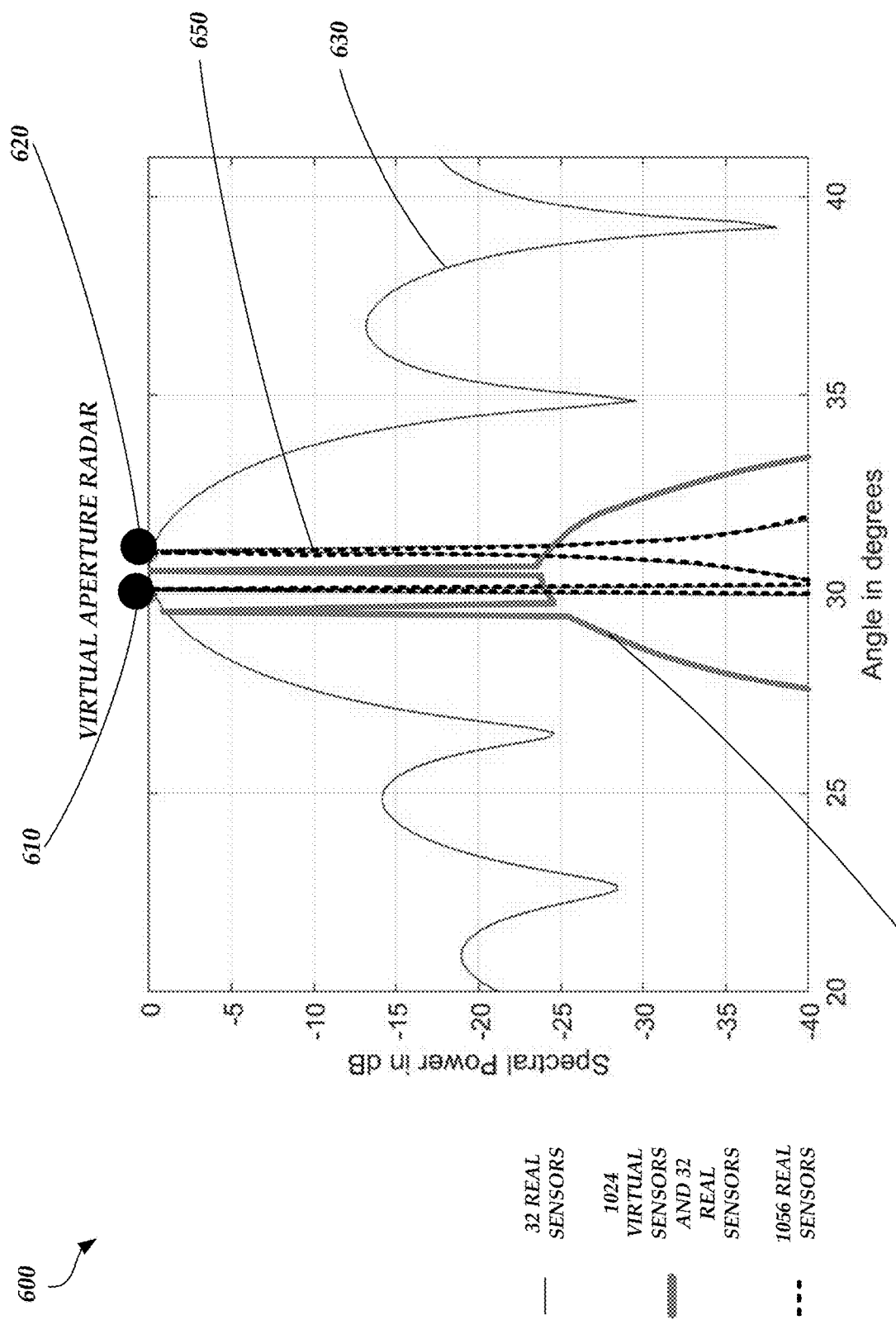
FIG. 6 illustrates a graph depicting target detection using virtual aperture postprocessing and using solely real sensors when targets are 1 degree apart.

FIG. 6 illustrates a graph 600 depicting target detection using virtual aperture postprocessing and using solely real sensors when targets 610 and 620 are 1 degree apart. The graph 600 (e.g., line 640) may be similar to an output displayed in a user interface as a result of producing the digital beamformer output. As illustrated in FIG. 6, the targets 610 and 620 are detected at 30° and 31°, respectively.

If a target detection system includes 32 real sensors, line 630 in the graph 600 depicts the target detection results. As illustrated in the graph 600, the line 630 has a peak or maximum at an angle at which the target 610 is present and a peak or maximum at which the target 620 is present. However, the line 630 also has multiple maxima at angles at which no targets are actually present. Target detection using the 32 real sensors is relatively poor.

If the high resolution RF system 108 predicts virtual sensor data for 1024 virtual sensors and combines this data with the real sensor data obtained from the 32 real sensors, line 640 in the graph 600 depicts the target detection results. As illustrated in the graph 600, the line 640 has a peak or maximum at an angle at which the target 610 is present, a peak or maximum at an angle at which the target 620 is present, and no other peaks or maxima. Target detection using the 32 real sensors and the 1024 virtual sensors is considerably more accurate than target detection using just the 32 real sensors.

While the accuracy of the virtual aperture postprocessing degrades slightly at lower spectral power, the results are very similar to the results that would be achieved if 1056 real sensors were actually installed instead of relying on the 32 real sensors and the virtual sensor data for 1024 virtual sensors. Line 650 depicts target detection results using 1056 real sensors. As illustrated in the graph 600, the line 650 has a peak or maximum at an angle at which the target 610 is present, a peak or maximum at an angle at which the target 620 is present, and no other peaks or maxima, and is very similar to the line 640.

Figure 7:
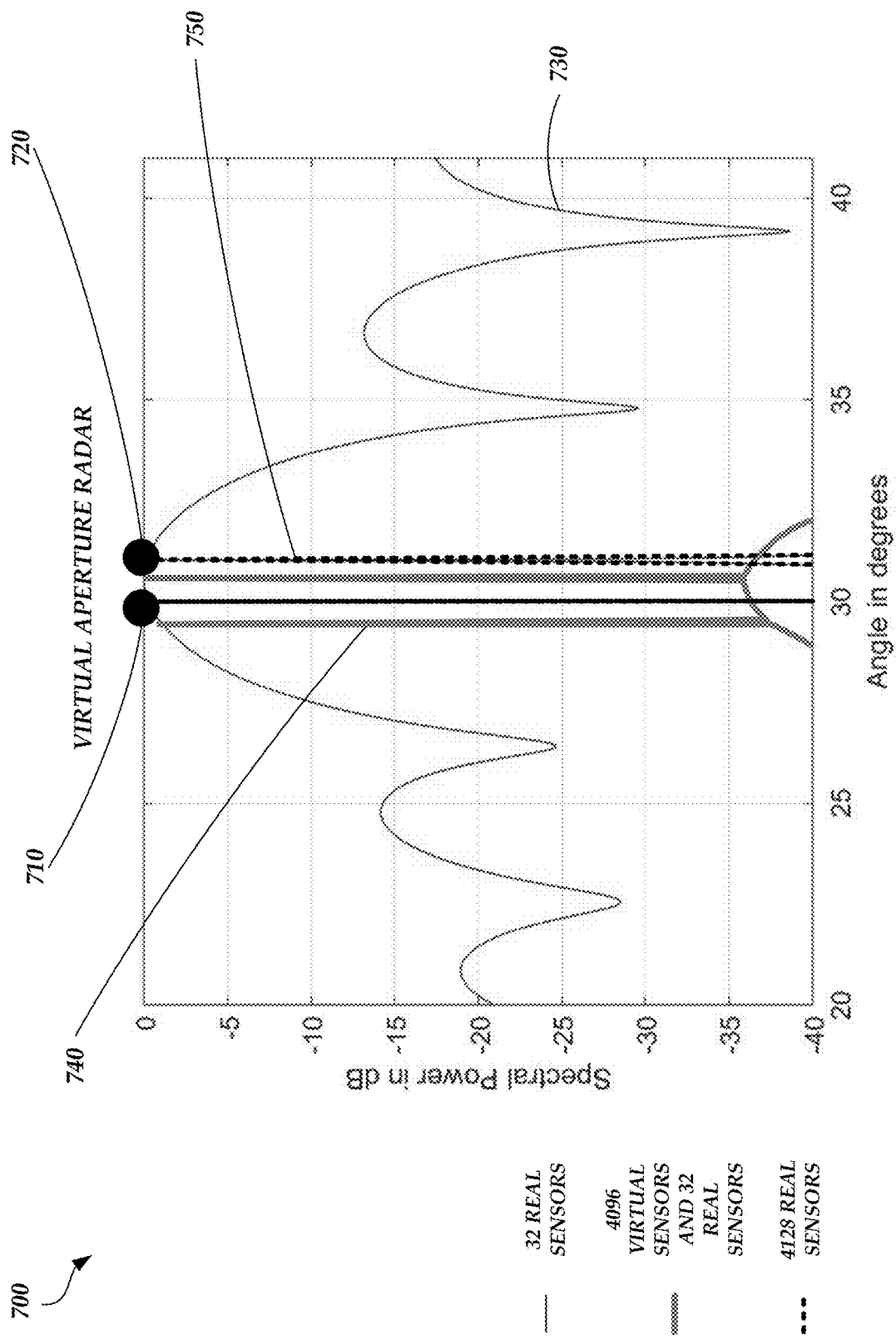
FIG. 7 illustrates another graph depicting target detection using virtual aperture postprocessing and using solely real sensors when targets are 1 degree apart.

FIG. 7 illustrates another graph 700 depicting target detection using virtual aperture postprocessing and using solely real sensors when targets 710 and 720 are 1 degree apart. The graph 700 (e.g., line 740) may be similar to an output displayed in a user interface as a result of producing the digital beamformer output. As illustrated in FIG. 7, the targets 710 and 720 are detected at 30° and 31°, respectively.

If a target detection system includes 32 real sensors, line 730 in the graph 700 depicts the target detection results. As illustrated in the graph 700, the line 730 has a peak or maximum at an angle at which the target 710 is present and a peak or maximum at which the target 720 is present. However, the line 730 also has multiple maxima at angles at which no targets are actually present. Target detection using the 32 real sensors is relatively poor.

If the high resolution RF system 108 predicts virtual sensor data for 4096 virtual sensors and combines this data with the real sensor data obtained from the 32 real sensors, line 740 in the graph 700 depicts the target detection results. As illustrated in the graph 700, the line 740 has a peak or maximum at an angle at which the target 710 is present, a peak or maximum at an angle at which the target 720 is present, and no other peaks or maxima. Target detection using the 32 real sensors and the 4096 virtual sensors is considerably more accurate than target detection using just the 32 real sensors.

While the accuracy of the virtual aperture postprocessing degrades slightly at lower spectral power, the results are very similar to the results that would be achieved if 4128 real sensors were actually installed instead of relying on the 32 real sensors and the virtual sensor data for 4096 virtual sensors. Line 750 depicts target detection results using 4128 real sensors. As illustrated in the graph 700, the line 750 has a peak or maximum at an angle at which the target 710 is present, a peak or maximum at an angle at which the target 720 is present, and no other peaks or maxima, and is very similar to the line 740.

Computing System

Figure 8:
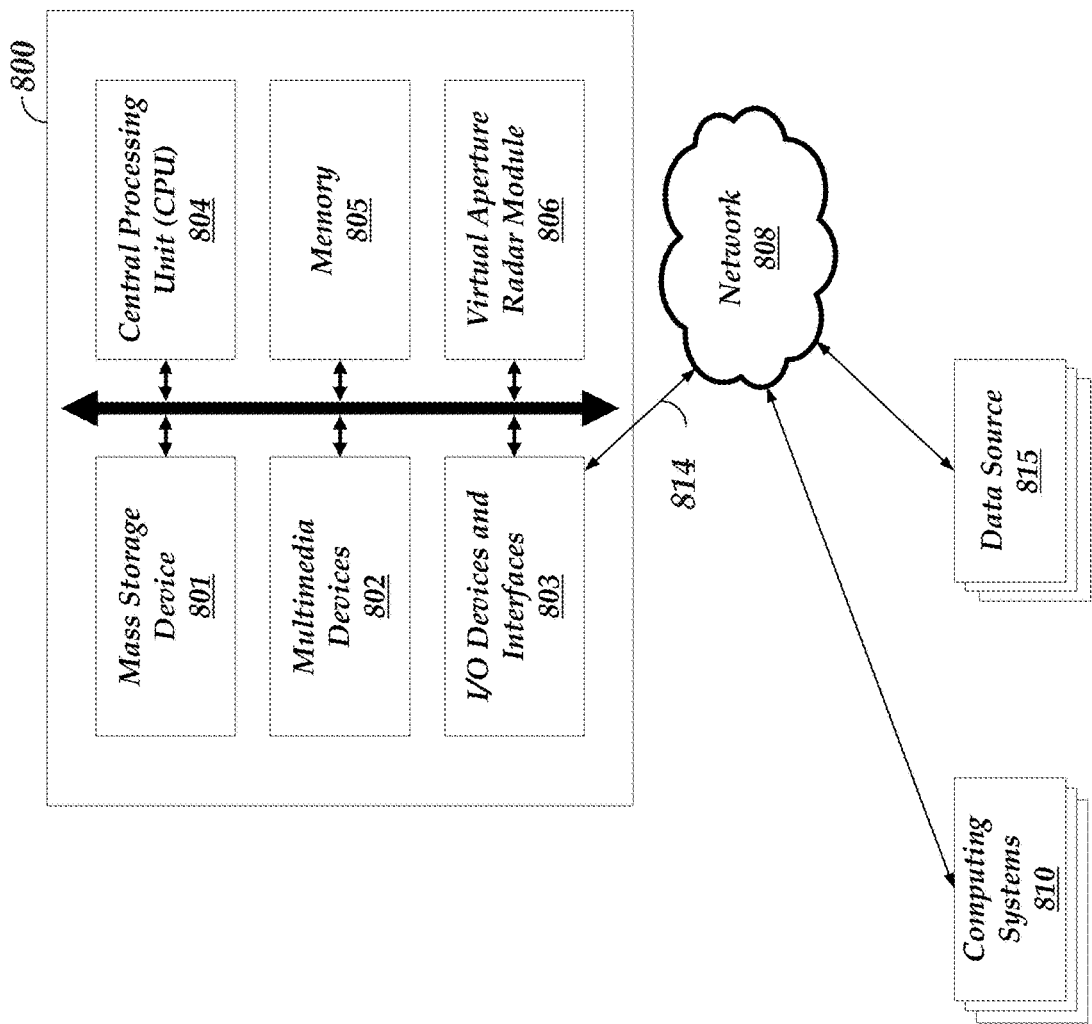
FIG. 8 is a block diagram depicting one embodiment of a computer hardware system configured to implement one or more embodiments of the target detection systems and/or high resolution RF system described herein.

In some embodiments, the various target detection systems 105A-105E and/or high resolution RF system 108 described above can include a computing system 800 system as illustrated in FIG. 8, which is a block diagram of one embodiment of a computing system. In some embodiments, the computing system 800 can be in communication with one or more computing systems 810 and/or one or more data sources 815 via one or more networks 808. The computing system 800 may be used to implement one or more of the systems and methods described herein. For example, in some embodiments, the computing system 800 may be configured to perform the virtual aperture postprocessing described herein. While FIG. 8 illustrates one embodiment of a computing system 800, it is recognized that the functionality provided for in the components and modules of computing system 800 may be combined into fewer components and modules or further separated into additional components and modules.

In some embodiments, the system 800 comprises a virtual aperture radar module 806 that carries out the functions described herein with reference to performing virtual aperture postprocessing, including any one of the methods described above. For example, the virtual aperture radar module 806 may predict virtual sensor data, generate a virtual sensor spectrum, and combine a real sensor spectrum with the virtual sensor spectrum to produce a digital beamformer output. The virtual aperture radar module 806 may be executed on the computing system 800 by a central processing unit 804 discussed further below. In some embodiments, one or more of the computing systems 800, 810 can comprise a data processing module that carries out various image generation functions described herein, such as the generation of a range-Doppler movie or animation, a graph showing a digital beamformer output, etc.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into submodules despite their physical organization or storage.

In some embodiments, the computing system 800 also comprises a mainframe computer suitable for controlling and/or communicating with large databases. performing high volume transaction processing, and generating reports from large databases. The computing system 800 also comprises a central processing unit ("CPU") 804, which may comprise one or more conventional microprocessors. The computing system 800 further comprises a memory 805, such as random access memory ("RAM") for temporary storage of information and/or a read only memory ("ROM") for permanent storage of information, and can include a mass storage device 801, such as a hard drive, diskette, or optical media storage device. Typically, the modules of the computing system 800 are connected to the computer using a standards-based bus system. In different embodiments, the standards-based bus system could be Peripheral Component Interconnect (PCI), Microchannel, SCSI, Industrial Standard Architecture (ISA) and Extended ISA (EISA) architectures, for example.

In some embodiments, the computing system 800 can include one or more commonly available input/output (I/O) devices and interfaces 803, such as a keyboard, mouse, touchpad, and printer. In one embodiment, the I/O devices and interfaces 803 comprise one or more display devices (e.g., the display 180), such as a monitor, that allows the visual presentation of data to a user. More particularly, a display device provides for the presentation of GUIs, application software data, and multimedia presentations, for example. In the embodiment of FIG. 8, the I/O devices and interfaces 803 also provide a communications interface to various external devices. The computing system 800 may also comprise one or more multimedia devices 802, such as speakers, video cards, graphics accelerators, microphones, hydrophones, photodetectors, for example.

The computing system 800 may run on a variety of computing devices, such as, for example, a server, a Windows server, a Structure Query Language server, a Unix server, a personal computer, a mainframe computer, a laptop computer, a cell phone, a personal digital assistant, a kiosk, an audio player, and so forth. The computing system 800 is generally controlled and coordinated by operating system software, such as z/OS, Windows 95, Windows 98, Windows NT, Windows 2000, Windows XP, Windows Vista, Windows 7, Windows 8, Windows 10, Linux, BSD, SunOS, Solaris, or other compatible operating systems. In Macintosh systems, the operating system may be any available operating system, such as MAC OS X. In other embodiments, the computing system 800 may be controlled by a proprietary operating system. Conventional operating systems control and schedule computer processes for execution, perform memory management, provide file system, networking, and I/O services, and provide a user interface, such as a graphical user interface ("GUI"), among other things.

In the embodiment of FIG. 8, the computing system 800 is coupled to a network 808, such as a LAN, WAN, or the Internet, for example, via a wired, wireless, or combination of wired and wireless, communication link 814. The network 808 communicates with various computing devices and/or other electronic devices via wired or wireless communication links. In the embodiment of FIG. 8, the network 808 is communicating with one or more computing systems 810 and/or one or more data sources 815.

Access to the virtual aperture radar module 806 of the computer system 800 by computing systems 810 and/or by data sources 815 may be through a web-enabled user access point such as the computing systems' 810 or data source's 815 personal computer, cellular phone, laptop, tablet, or other device capable of connecting to the network 808. Such a device may have a browser module that is implemented as a module that uses text, graphics, audio, video, and other media to present data and to allow interaction with data via the network 808.

The browser module may be implemented as a combination of an all points addressable display such as a cathode-ray tube (CRT), a liquid crystal display (LCD), a plasma display, a light-emitting diode (LED) display, an organic light-emitting diode (OLED) display, or other types and/or combinations of displays. In addition, the browser module may be implemented to communicate with input devices 803 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 800 may comprise a physical or logical connection established between a remote microprocessor and a mainframe host computer for the express purpose of uploading, downloading, or viewing interactive data and databases on-line in real time. The remote microprocessor may be operated by an entity operating the computer system 800, including the client server systems or the main server system, and/or may be operated by one or more of the data sources 815 and/or one or more of the computing systems 810. In some embodiments, terminal emulation software may be used on the microprocessor for participating in the micro-mainframe link.

In some embodiments, computing systems 810 that are internal to an entity operating the computer system 800 may access the virtual aperture radar module 806 internally as an application or process run by the CPU 804.

In an embodiment, a user access point or user interface 803 comprises a personal computer, a laptop computer, a cellular phone, a GPS system, a Blackberry® device, a portable computing device, a server, a computer workstation, a local area network of individual computers, an interactive kiosk, a personal digital assistant, an interactive wireless communications device, a handheld computer, an embedded computing device, or the like.

In addition to the systems that are illustrated in FIG. 8, the network 808 may communicate with other data sources or other computing devices. The computing system 800 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a signal database, an object-oriented database, and/or a record-based database.

Example Use Cases

As discussed above, in addition to applications with RADAR (regular and millimeter), various embodiments described herein can be used in target detection systems that generate signals or waveforms to detect objects, including LIDAR, SONAR, ultrasound, MRI, CT scans, non-destructive inspections (e.g., scanning acoustic microscopy, ultrasonic, magnetic-particle, etc.), etc., to name a few examples.

Figure 9:
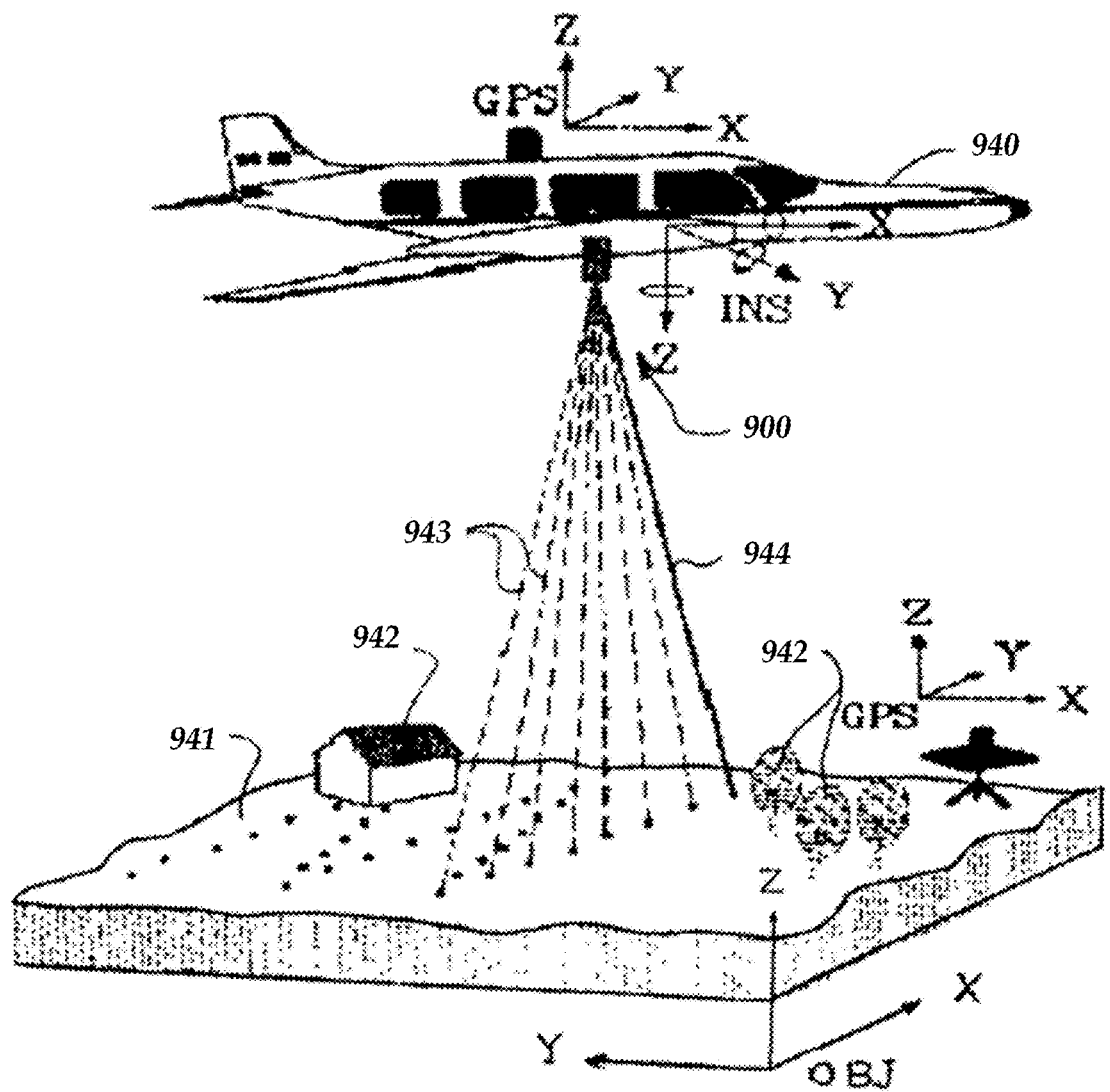
FIG. 9 is a schematic diagram that illustrates implementation of an embodiment of a target detection system that uses or that communicates with a high resolution RF system that uses virtual aperture postprocessing as described herein in order to image targets on the ground from an aircraft via LIDAR.

For example, FIG. 9 is a schematic diagram that illustrates implementation of an embodiment of a target detection system 900 that uses or that communicates with a high resolution RF system that uses virtual aperture postprocessing as described herein in order to image targets on the ground 941 from an aircraft 940 via LIDAR. LIDAR is an optical remote sensing technology that measures properties of scattered light to find range and/or other information of a distant target. The prevalent method to determine distance to an object 942 or surface 941 is to use laser pulses 943 (e.g., a poly-phase code waveform laser pulse and/or an enhanced waveform laser pulse). Like RADAR technology, which uses radio waves, the range to an object 942 is determined by measuring the time delay between transmission of a laser pulse 943 and detection of the reflected signal 944.

A recent addition to a police officer's speed detection arsenal is LIDAR. To measure a vehicle's speed, LIDAR determines how long it takes a light pulse to travel from the LIDAR gun to the vehicle and back. From this information, LIDAR can quickly find the distance between the gun and the vehicle. By making several measurements and comparing the distance the vehicle traveled between measurements, LIDAR very accurately determines the vehicle's speed. LIDAR uses a laser beam of invisible infrared light. The beam reflects off any flat surface on the vehicle. Since the beam is very narrow, it is impossible for any laser detector to determine the distance between the LIDAR source and the vehicle.

Just as there are two types of RADAR, there are also two types of lasers: Pulsed Lasers and Continuous Wave (CW) Lasers, which are used in LIDAR applications. The present disclosure includes use of the target detection system 900 with virtual aperture postprocessing functionality for use in ranging and Doppler measurement applications.

Figure 10:
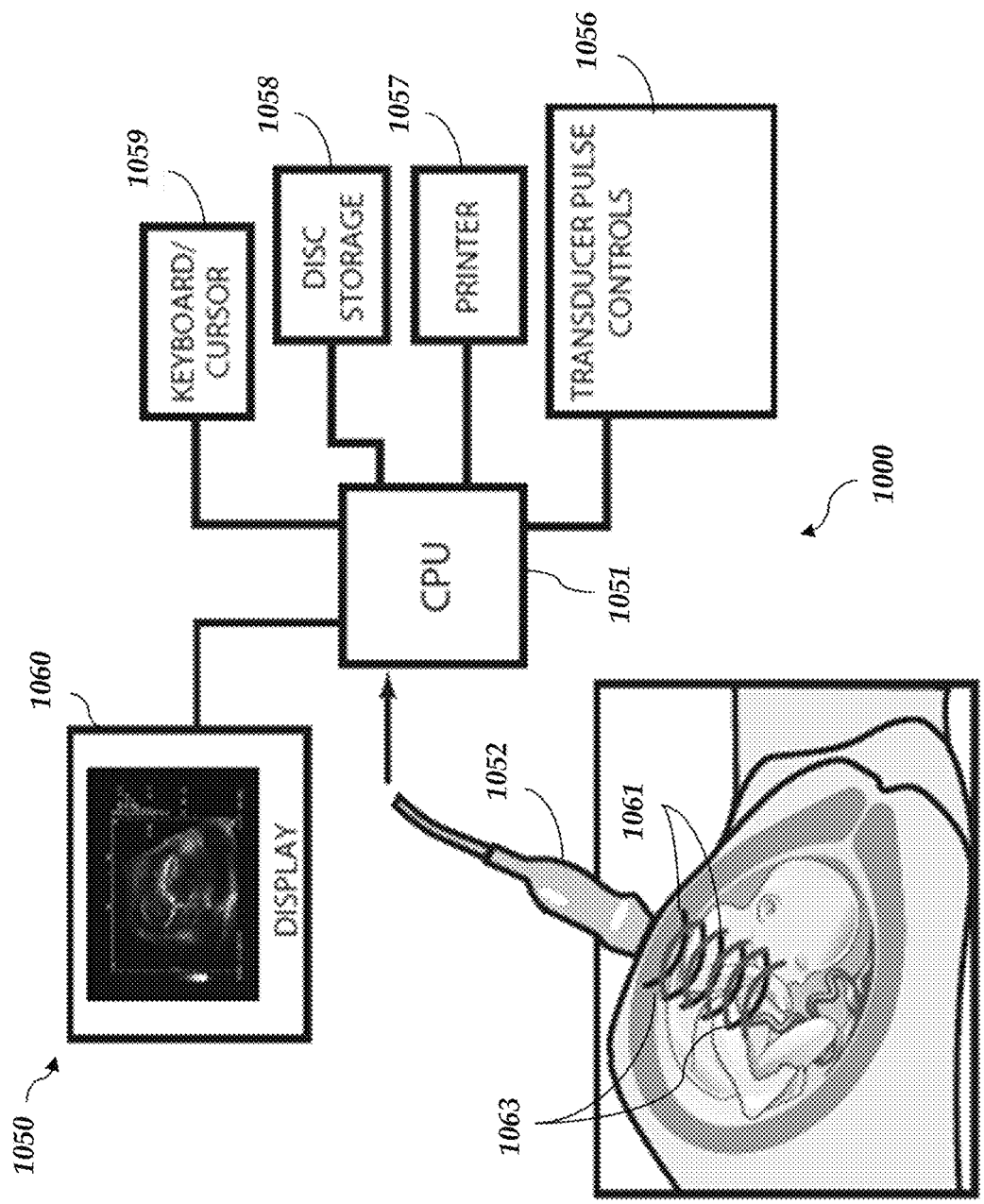
FIG. 10 is a schematic diagram that illustrates the implementation of one embodiment of a target detection system that uses or that communicates with a high resolution RF system that uses virtual aperture postprocessing in an ultrasonic imaging application.

Referring next to FIG. 10, a high-resolution medical ultrasound system 1050 which utilizes an illustrative embodiment of the target detection system 1000 that uses or that communicates with a high resolution RF system that uses virtual aperture postprocessing as described herein is illustrated. The target detection system 1000 may include an ultrasound transducer 1052. A waveform can be sent to the transducer 1052. In some embodiments, a CPU 1051 that can be used to generate a waveform and that can be used to perform virtual aperture postprocessing may interface with the ultrasound transducer 1052. Additional devices may interface with the CPU 1051. The additional devices may include transducer pulse controls 1056 (which can be used to modify aspects of the waveform, such as its duration), a printer 1057, a disc storage device 1058, a keyboard/cursor 1059, and/or a display 1060, for example and without limitation.

The target detection system 1000 transmits high frequency sound pulses 1061 through the ultrasound transducer 1052 into a patient's body 1062. The sound pulses 1061 travel through the patient's body 1062, passing through different types of tissue. Although the average speed of sound through human tissues is 1540 m/s, it does vary with exact tissue type. While the speed of sound through fat is 1459 m/s, it passes through bone at 4080 m/s. When sound encounters two adjacent tissue types with different acoustic properties, a proportion of the sound energy is reflected as reflected sound pulses 1063. These boundaries between different tissue types are called "acoustic interfaces."

The amount of reflected sound pulses 1063 reflected back from an acoustic interface depends on a property of the materials on either side of the interface called "acoustic impedance." The acoustic impedance of a material is simply the density of the material multiplied by the speed at which sound travels through the material.

Figure 11:
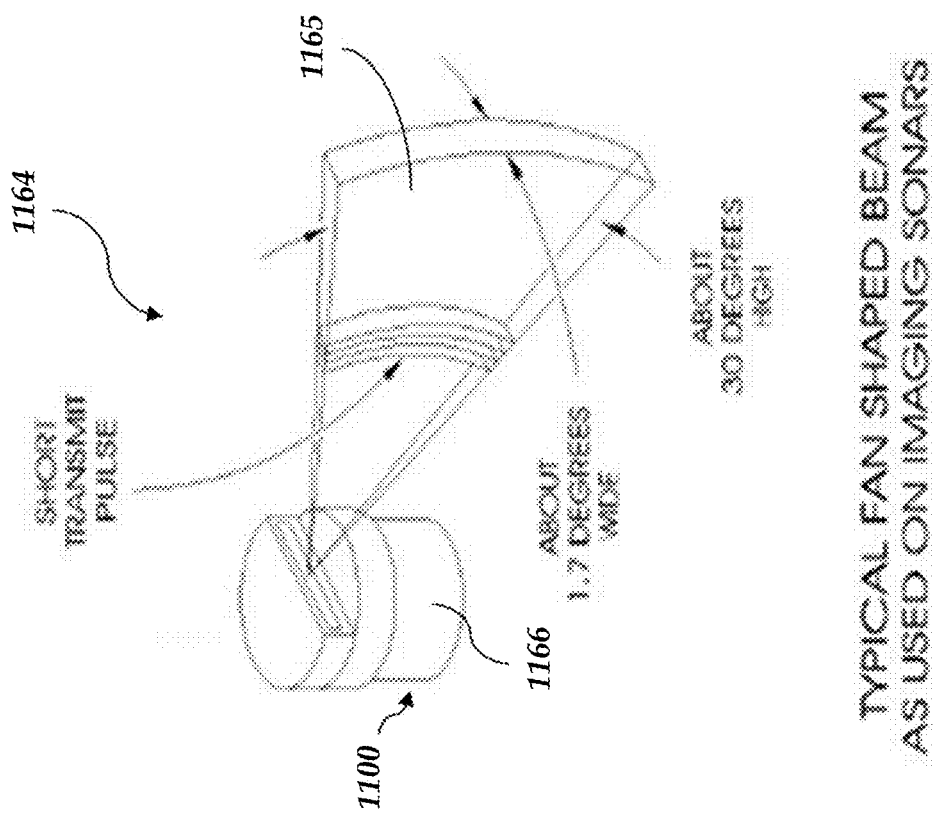
FIG. 11 is a schematic diagram that illustrates the implementation of one embodiment of a target detection system that uses or that is in communication with a high resolution RF system that uses virtual aperture postprocessing in a high resolution SONAR application.

Referring next to FIG. 11, a high resolution SONAR system 1164 which utilizes an illustrative embodiment of a target detection system 1100 that uses or that is in communication with a high resolution RF system that uses virtual aperture postprocessing is illustrated. As described above, the target detection system 1100 can use one or more waveforms to detect an object. The target detection system 1100 of the high resolution SONAR system 1164 can be used to power and drive the SONAR beam generators 1166 of the target detection system 1100 to emit one or more SONAR pulses 1165 which may have a fan shape, as illustrated. The high resolution SONAR system 1164 uses sound propagation (usually underwater, as in submarine navigation) to navigate, communicate with or detect other vessels. There are two types of technology that share the name "SONAR": passive SONAR is essentially listening for the sound made by vessels; active SONAR is emitting pulses of sounds and listening for echoes. SONAR may be used as a means of acoustic location and of measurement of the echo characteristics of targets in the water. Acoustic location in air was used before the introduction of RADAR.

Figure 12:
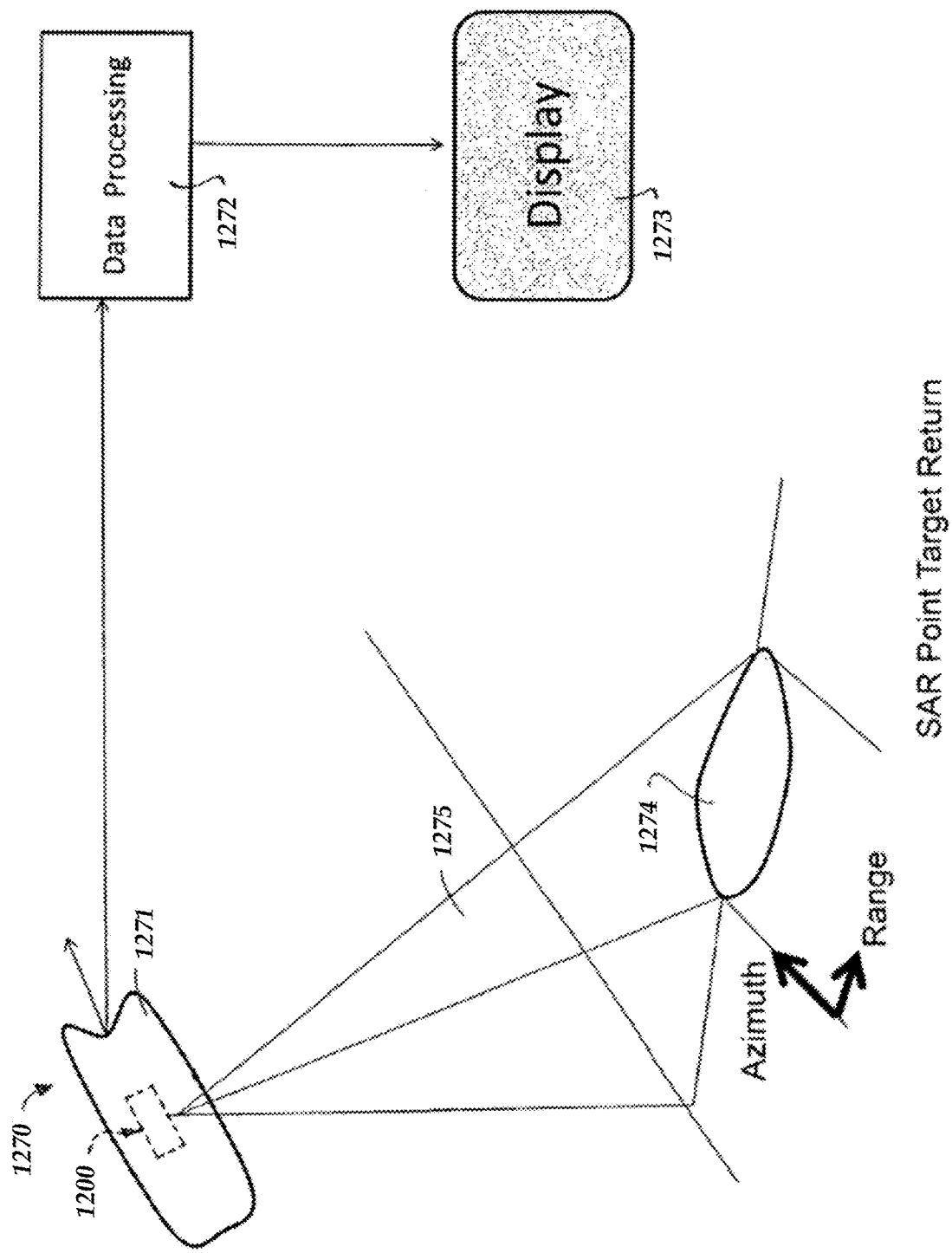
FIG. 12 is a schematic diagram that illustrates the implementation of one embodiment of a target detection system that uses or that is in communication with a high resolution RF system that uses virtual aperture postprocessing in a high resolution synthetic aperture application.

Referring next to FIG. 12, a high resolution synthetic aperture RADAR system 1270 that utilizes an illustrative embodiment of a target detection system 1200 that uses or that is in communication with a high resolution RF system that uses virtual aperture postprocessing is illustrated. As described above, the target detection system 1200 can use one or more waveforms to detect an object. The target detection system 1200 may be provided in a spacecraft 1271 and emits one or more high resolution synthetic RADAR pulses 1275 against a target 1274. A reflected signal (not illustrated) is reflected from the target 1274 back to the target detection system 1200. A data processor 1272 interfaces with or can be included as part of the target detection system 1200 and performs virtual aperture postprocessing to the synthetic aperture RADAR signal(s) to enhance the accuracy of target detection. A high resolution image of the target 1274, based on the virtual aperture postprocessing and/or the synthetic aperture RADAR operations, is shown on a display 1273 that interfaces with the data processor 1272.

Beginning with the launch of SESAT in 1978, Synthetic Aperture RADAR (SAR) has provided a wealth of information on such diverse phenomena as surface waves, internal waves, currents, upwelling, shoals, sea ice, wind and rainfall. SAR is the premier sensor for such phenomena because it is sensitive to small surface roughness changes of the order of RADAR wavelength (1 millimeter down to several centimeters). It is also independent of solar illumination and is generally unaffected by cloud cover. Most modern RADARs (including SARs) transmit a pulse 1275 known as linear modulated waveform and use the standard RADAR principles of range resolution and Doppler shift. Hence, the target detection system 1200 or a high resolution RF system in communication with the target detection system 1200 can apply virtual aperture postprocessing to SAR signal(s) to produce and display images that have a higher resolution than typical SAR images on the display 1273.

Figure 13A:
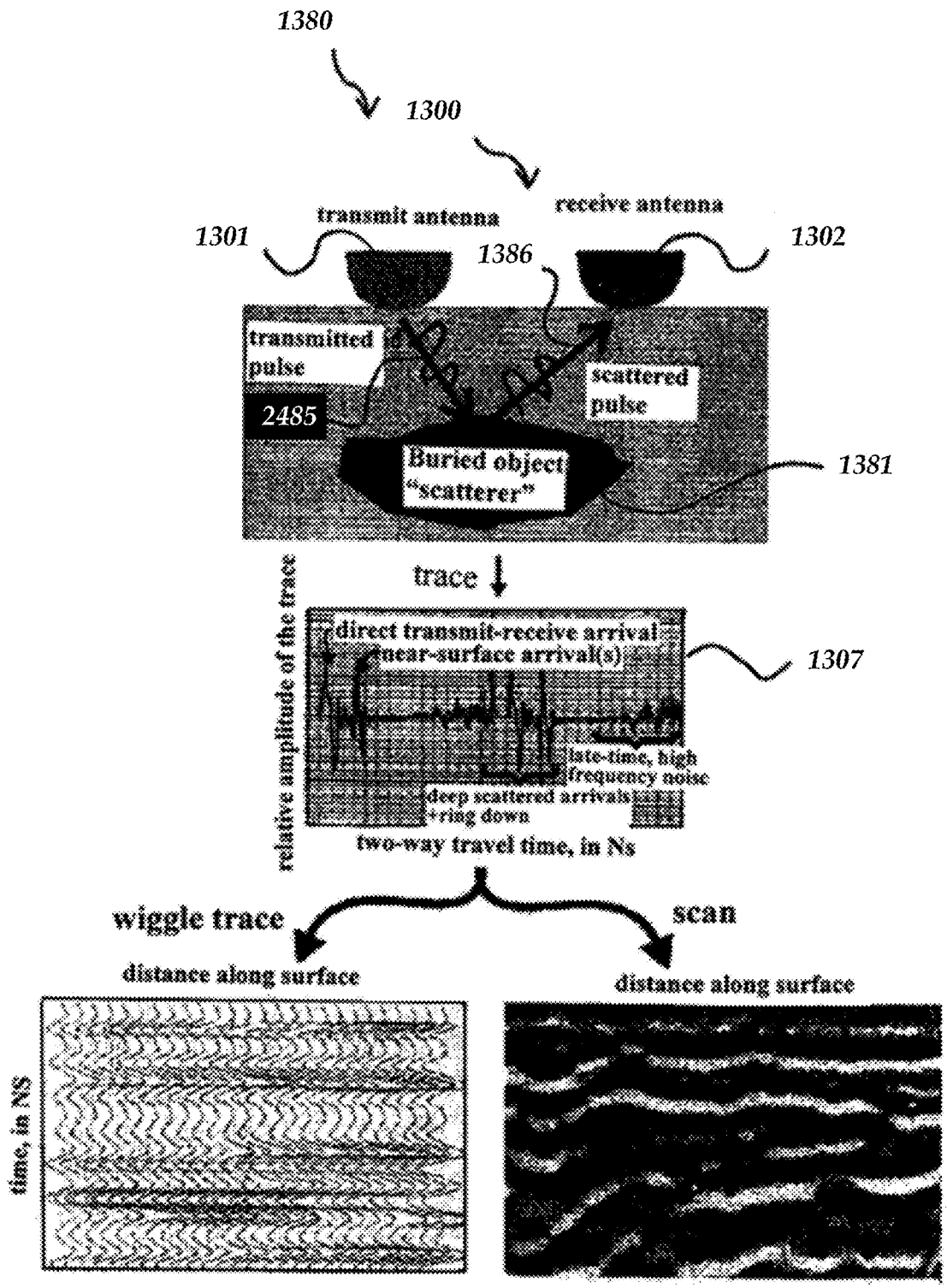
FIGS. 13A-13C are schematic diagrams that illustrate the implementation of one embodiment of a target detection system that uses or that is in communication with a high resolution RF system that uses virtual aperture postprocessing in a high resolution ground penetrating RADAR application.
Figure 13B:
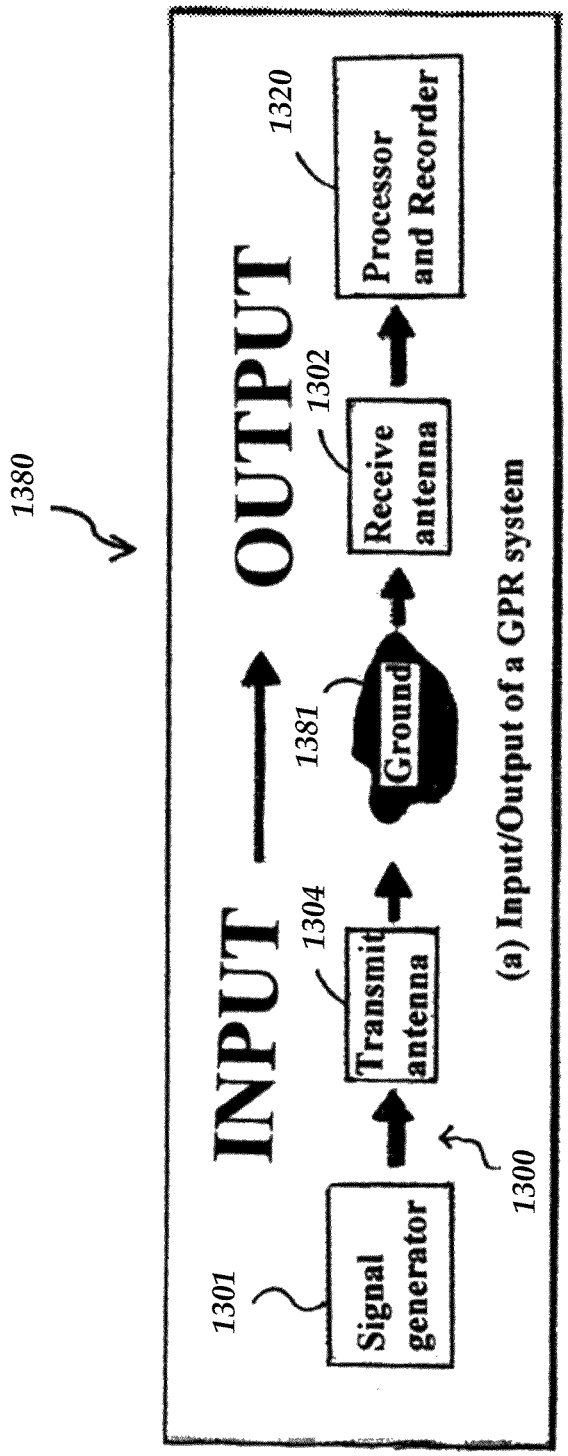
Figure 13C:
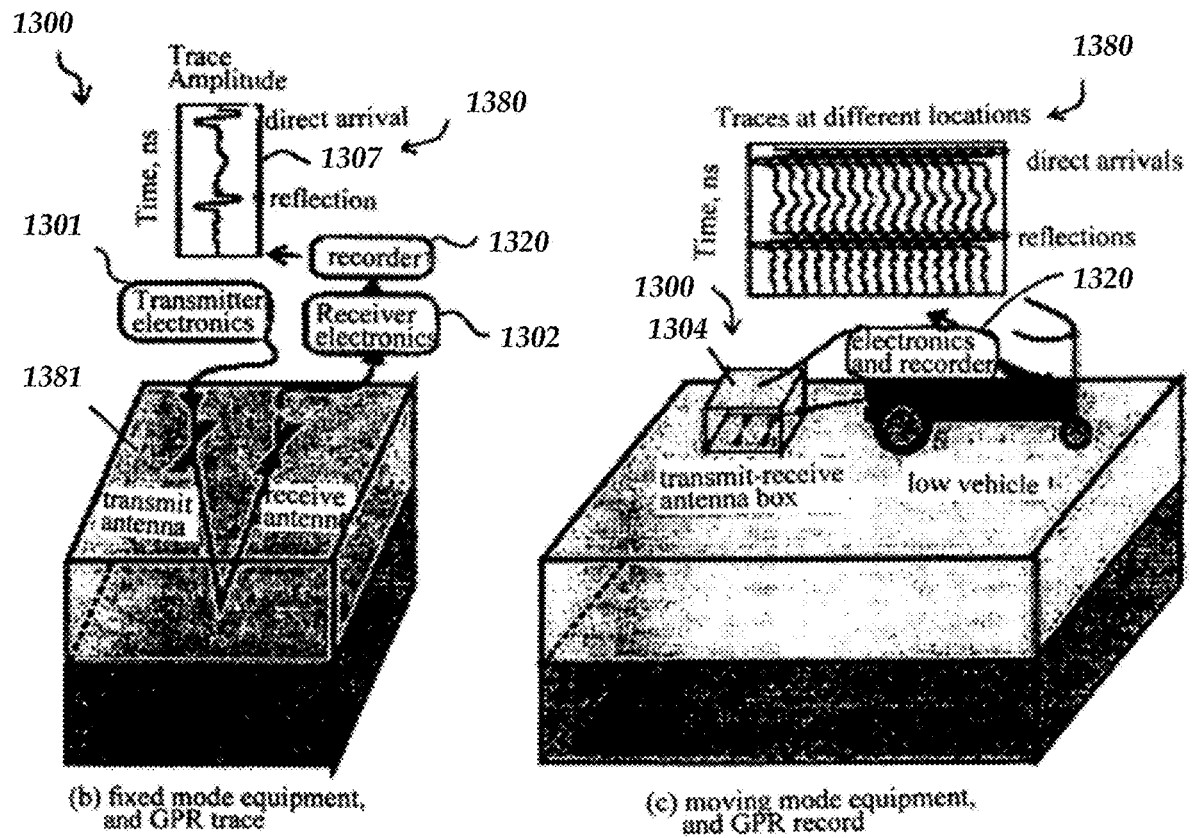

Referring next to FIGS. 13A-13C, a high resolution ground penetrating RADAR system 1380 which utilizes an illustrative embodiment of a target detection system 1300 that uses or that is in communication with a high resolution RF system that uses virtual aperture postprocessing is illustrated. As described above, the target detection system 1300 can use one or more waveforms to detect an object. Ground Penetrating RADAR (GPR) utilizes a very short burst of radio-frequency energy as a pulse 1385 that is transmitted from the transmitter/signal generator 1301 via the transmit antenna 1304 of the target detection system 1300 and radiated into the ground 1381 to detect discontinuities in the ground 1381. The scattered pulses 1386 are reflected from the ground 1381 and detected by a receive antenna 1302 of the target detection system 1300. A signal processor and recorder 1320 performs virtual aperture postprocessing on the scattered pulses 1386 and/or displays a high-resolution image of the ground 1381 or objects or discontinuities in the ground 1381 on a display 1307, as illustrated in FIGS. 13A and 13B. Alternative applications of the target detection system 1300 in implementation of the high resolution ground penetrating RADAR system 1380 are illustrated in FIG. 13C.

The objects or discontinuities in the ground 1381 can be cavities, voids, transitions between soil and rock, filled areas and/or buried objects. The performance of conventional GPRs is limited by attenuation of the transmitted pulse in moist soils, especially soils having high clay content. GPRs are used to detect a boundary between rock and air (a cave or cavity) or between one type of soil and another (for example undisturbed soil-to back-filled soil). The strength of the echo signal is dependent on the absorption of the signal to and from the radar to the target, the size and shape of the target, and the degree of discontinuity at the reflecting boundary.

Figure 14:
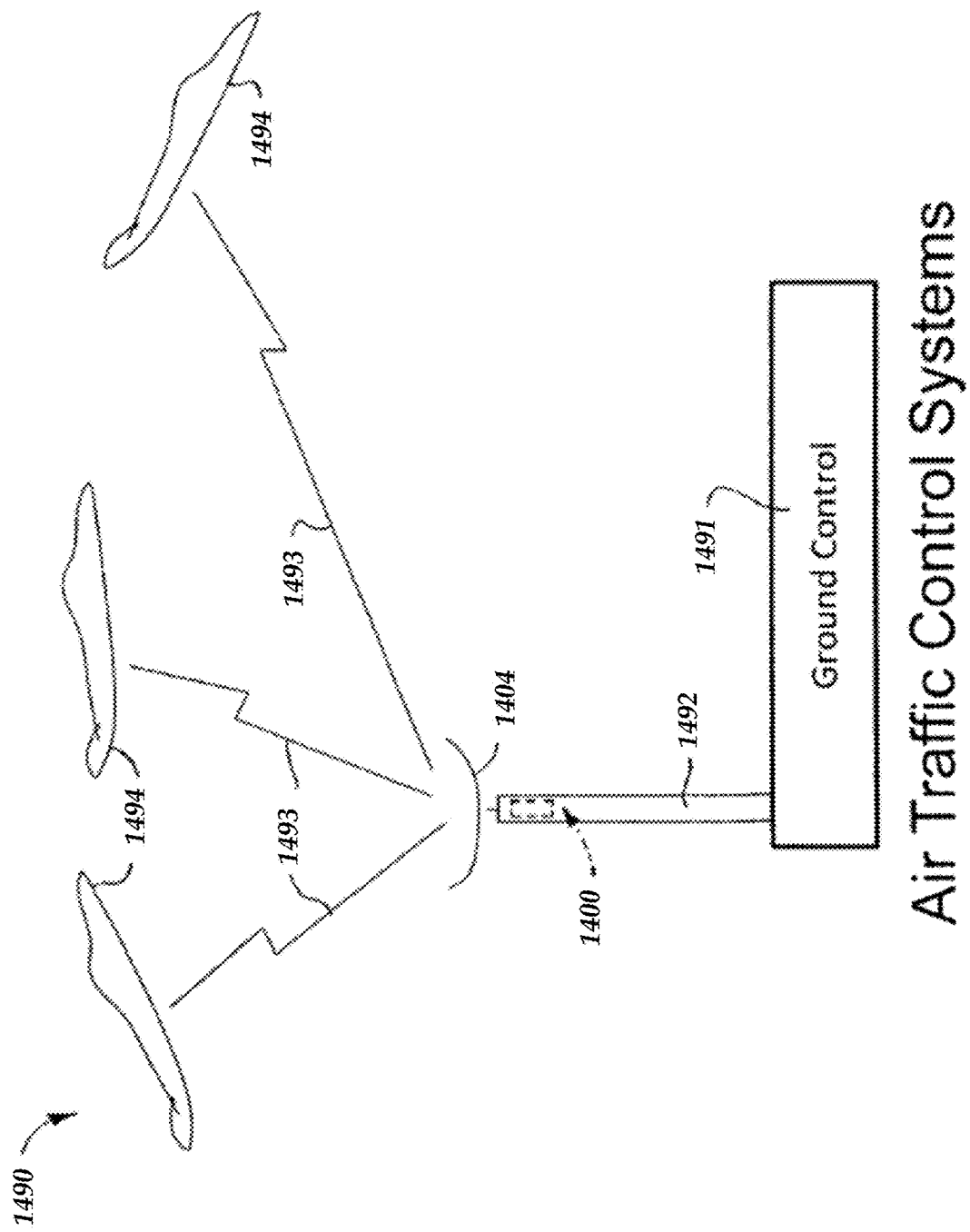
FIG. 14 is a schematic diagram that illustrates the implementation of one embodiment of a target detection system that uses or that is in communication with a high resolution RF system that uses virtual aperture postprocessing in a high resolution air traffic control system application.

Referring next to FIG. 14, a high resolution air traffic control system 1490 which utilizes an illustrative embodiment of a target detection system 1400 that uses or that is in communication with a high resolution RF system that uses virtual aperture postprocessing is illustrated. As described above, the target detection system 1400 can use one or more waveforms to detect an object. The air traffic control system 1490 may include a ground control 1491 having a ground control tower 1492. The target detection system 1400 may be provided in the ground control tower 1492. An antenna 1404 of the target detection system 1400 emits pulses 1493 that are reflected from flying aircraft 1494. Pulses reflected from the aircraft 1494 (not illustrated) are received by the antenna 1404 and processed using virtual aperture postprocessing in a manner as described herein to generate a high-resolution image of the aircraft 1494.

Air traffic control systems are critically dependent on the use of RADAR technology for the safety of tens of thousands of aircrafts and millions of passengers every day. With the increase in air traffic, there is need for high resolution air traffic tracking systems. Currently, pulsed radars and FMCW radars are used for range measurement and Doppler measurements. With the use of the target detection system 1400, the performance of the air traffic systems 1490 can be significantly improved with more accurate estimation and detection of aircraft 1494. In particular, the relative positions of those aircraft 1494 which would otherwise come within dangerously close proximity to each other may be detected sufficiently early to prevent such close proximity and avert potential aviation accidents.

In addition to the example use cases described above, the target detection system and/or high resolution RF system described herein can be implemented in medical scanning devices (e.g., implemented within the computer system, coils, magnet, scanner, etc. of MRI machines, implemented within the gantry, X-RAY tube, detector, control console, etc. of CT scanners, etc.), watercraft like submarines or ships (e.g., as part of the components used for SONAR applications), aircraft (e.g., as part of the components used for RADAR applications), automobiles (e.g., as part of the components used for LIDAR applications), and/or the like.

Terminology

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of the stated amount.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A target detection system, the system comprising:
 a signal generator configured to generate a waveform;
 a transmitter configured to transmit the waveform via an antenna;
 a receiver configured to receive a reflected waveform, wherein the reflected waveform comprises a version of the waveform that reflected off a target;
 a processor in communication with the receiver and configured with specific computer-executable instructions to:

determine a real sensor spectrum using the reflected waveform;

estimate a preliminary angle of the target based on the real sensor spectrum;

predict intermediate virtual sensor data for the target based on the estimated preliminary angle;

determine a virtual sensor spectrum using the predicted intermediate virtual sensor data; and combine the real sensor spectrum and the virtual sensor spectrum to form a beamformer output; and a display device configured to display a graphical representation of the beamformer output in a user interface.

2. The target detection system of claim 1, wherein the processor is further configured with specific computer-executable instructions to compute a fast Fourier transform (FFT) of the reflected waveform to form the real sensor spectrum.

3. The target detection system of claim 1, wherein the processor is further configured with specific computer-executable instructions to:

determine a peak in the real sensor spectrum; and estimate the preliminary angle of the target to be an angle at which the peak in the real sensor spectrum occurs.

4. The target detection system of claim 1, wherein the processor is further configured with specific computer-executable instructions to predict the intermediate virtual sensor data for the target based on the estimated preliminary angle and a number of virtual sensors that supplement the receiver.

5. The target detection system of claim 1, wherein the processor is further configured with specific computer-executable instructions to compute a fast Fourier transform (FFT) of the predicted intermediate virtual sensor data to form the virtual sensor spectrum.

6. The target detection system of claim 1, wherein the processor is further configured with specific computer-executable instructions to:

determine a peak in the beamformer output; and estimate an angle of the target to be an angle at which the peak in the beamformer output occurs, wherein the user interface depicts an indication of the estimated angle of the target.

7. The target detection system of claim 1, wherein the graphical representation comprises an indication of a location of the target.

8. The target detection system of claim 1, wherein the receiver is configured to receive the reflected waveform and a second reflected waveform, wherein the second reflected waveform comprises a version of the waveform that reflected off a second target.

9. The target detection system of claim 8, wherein the processor is further configured with specific computer-executable instructions to:

determine an average of the reflected waveform and the second reflected waveform to determine the real sensor spectrum;

identify a first peak in the real sensor spectrum;

estimate the preliminary angle of the target to be an angle at which the first peak in the real sensor spectrum occurs;

identify a second peak in the real sensor spectrum;

estimate a preliminary angle of the second target to be an angle at which the second peak in the real sensor spectrum occurs;

predict a second intermediate virtual sensor data for the second target based on the estimated preliminary angle of the second target; and determine an average of the intermediate virtual sensor data and the second intermediate virtual sensor data to form the virtual sensor spectrum.

10. The target detection system of claim 1, wherein the target detection system is one of a radio detection and ranging (RADAR) system, a light detection and ranging (LIDAR) system, a sound navigation and ranging (SONAR) system, an autonomous vehicle, an ultrasound system, a magnetic resonance imaging (MRI) system, or a computing tomography (CT) system.

11. A method for detecting a target, the method comprising:

as implemented by a target detection system comprising physical hardware, generating a waveform;

transmitting the waveform;

receiving a reflected waveform, wherein the reflected waveform comprises a version of the waveform that reflected off a target;

determining a real sensor spectrum using the reflected waveform;

estimating a preliminary angle of the target based on the real sensor spectrum;

predicting intermediate virtual sensor data for the target based on the estimated preliminary angle;

determining a virtual sensor spectrum using the predicted intermediate virtual sensor data; and combining the real sensor spectrum and the virtual sensor spectrum to form a beamformer output that, when graphically displayed in a user interface, indicates a location at which the target is detected.

12. The method of claim 11, wherein determining a real sensor spectrum further comprises computing a fast Fourier transform (FFT) of the reflected waveform to form the real sensor spectrum.

13. The method of claim 11, wherein estimating a preliminary angle of the target further comprises:

determine a peak in the real sensor spectrum; and estimating the preliminary angle of the target to be an angle at which the peak in the real sensor spectrum occurs.

14. The method of claim 11, further comprising:

determining a peak in the beamformer output; and estimating an angle of the target to be an angle at which the peak in the beamformer output occurs, wherein the user interface depicts an indication of the estimated angle of the target.

15. The method of claim 11, further comprising:

receiving the reflected waveform and a second reflected waveform, wherein the second reflected waveform comprises a version of the waveform that reflected off a second target;

determining an average of the reflected waveform and the second reflected waveform to determine the real sensor spectrum;

identifying a first peak in the real sensor spectrum;

estimating the preliminary angle of the target to be an angle at which the first peak in the real sensor spectrum occurs;

identifying a second peak in the real sensor spectrum;

estimating a preliminary angle of the second target to be an angle at which the second peak in the real sensor spectrum occurs;

predicting a second intermediate virtual sensor data for the second target based on the estimated preliminary angle of the second target; and determining an average of the intermediate virtual sensor data and the second intermediate virtual sensor data to form the virtual sensor spectrum.

16. The method of claim 11, wherein the target detection system is one of a radio detection and ranging (RADAR) system, a light detection and ranging (LIDAR) system, a sound navigation and ranging (SONAR) system, an autonomous vehicle, an ultrasound system, a magnetic resonance imaging (MRI) system, or a computing tomography (CT) system.

17. Non-transitory, computer-readable storage media comprising computer-executable instructions for detecting a target, wherein the computer-executable instructions, when executed by a target detection system, cause the target detection system to:
   transmit a waveform;
   process a reflected waveform, wherein the reflected waveform comprises a version of the waveform that reflected off a target;
   determine a real sensor spectrum using the reflected waveform;
   estimate a preliminary angle of the target based on the real sensor spectrum;
   predict intermediate virtual sensor data for the target based on the estimated preliminary angle;
   determine a virtual sensor spectrum using the predicted intermediate virtual sensor data; and
   combine the real sensor spectrum and the virtual sensor spectrum to form a beamformer output that, when graphically displayed in a user interface, indicates a location at which the target is detected.

18. The non-transitory, computer-readable storage media of claim 17, wherein the computer-executable instructions further cause the target detection system to:
   determine a peak in the beamformer output; and
   estimate an angle of the target to be an angle at which the peak in the beamformer output occurs, wherein the user interface depicts an indication of the estimated angle of the target.

19. The non-transitory, computer-readable storage media of claim 17, wherein the computer-executable instructions further cause the target detection system to:
   process the reflected waveform and a second reflected waveform, wherein the second reflected waveform comprises a version of the waveform that reflected off a second target;
   determine an average of the reflected waveform and the second reflected waveform to determine the real sensor spectrum;
   identify a first peak in the real sensor spectrum;
   estimate the preliminary angle of the target to be an angle at which the first peak in the real sensor spectrum occurs;
   identify a second peak in the real sensor spectrum;
   estimate a preliminary angle of the second target to be an angle at which the second peak in the real sensor spectrum occurs;
   predict a second intermediate virtual sensor data for the second target based on the estimated preliminary angle of the second target; and
   determine an average of the intermediate virtual sensor data and the second intermediate virtual sensor data to form the virtual sensor spectrum.

20. The non-transitory, computer-readable storage media of claim 17, wherein the target detection system is one of a radio detection and ranging (RADAR) system, a light detection and ranging (LIDAR) system, a sound navigation and ranging (SONAR) system, an autonomous vehicle, an ultrasound system, a magnetic resonance imaging (MRI) system, or a computing tomography (CT) system.

* * * * *